United States Patent
Kell et al.

(10) Patent No.: US 10,862,842 B2
(45) Date of Patent: Dec. 8, 2020

(54) MANAGING SPECIALIZED OBJECTS IN A MESSAGE STORE

(71) Applicant: Telefonaktiebolaget LM Ericsson (publ), Stockholm (SE)

(72) Inventors: Dave Kell, New Westminster (CA); Cristina Badulescu, Roxboro (CA); Nancy M. Greene, Outremont (CA); Patrice Varinot, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 16/079,929

(22) PCT Filed: Feb. 25, 2016

(86) PCT No.: PCT/IB2016/051036
§ 371 (c)(1),
(2) Date: Aug. 24, 2018

(87) PCT Pub. No.: WO2017/144951
PCT Pub. Date: Aug. 31, 2017

(65) Prior Publication Data
US 2019/0104096 A1  Apr. 4, 2019

(51) Int. Cl.
*H04L 12/58* (2006.01)

(52) U.S. Cl.
CPC .............. *H04L 51/22* (2013.01); *H04L 51/10* (2013.01); *H04L 51/36* (2013.01)

(58) Field of Classification Search
CPC .......... H04L 51/22; H04L 51/10; H04L 51/36
See application file for complete search history.

(56) References Cited

U.S. PATENT DOCUMENTS 7,730,148 B1    6/2010   Mace et al.
2006/0085509 A1*  4/2006  Wener ............... G06Q 10/107
                                                        709/206

(Continued)

FOREIGN PATENT DOCUMENTS

WO    2009104860 A1    8/2009
WO    2017085531 A1    5/2017

OTHER PUBLICATIONS

Author Unknown, "Rich Communication Suite 5.3 Endorsement of OMA CPM 2.0 Message Storage," Official Document RCC.09, Version 5.0, Feb. 28, 2015, GSM Association, 22 pages.

(Continued)

*Primary Examiner* — Sargon N Nano
*Assistant Examiner* — Christopher B Robinson
(74) *Attorney, Agent, or Firm* — Patent Portfolio Builders, PLLC

(57) ABSTRACT

Systems and methods are disclosed herein that enable a client device to efficiently identify mailboxes containing objects of interest in a server-based message store. In some embodiments, a method of operation of a client device comprises sending a single request to a server for a list of mailboxes maintained by the server for a user that contain objects flagged with any of one or more flags specified in the single request. The method of operation of the client device further comprises, in response to the single request, receiving, from the server, the list of mailboxes maintained by the server for the user that contain objects flagged with any of the one or more flags specified in the single request. The method also comprises processing the list of mailboxes. In this manner, the client device is enabled to quickly and efficiently identify which mailboxes of the user contain objects of interest.

25 Claims, 7 Drawing Sheets

(56) References Cited

U.S. PATENT DOCUMENTS

| | | | |
|---|---|---|---|
| 2008/0177845 | A1 | 7/2008 | Bracewell et al. |
| 2008/0198979 | A1* | 8/2008 | Skakkebaek .......... H04L 51/066 379/88.13 |
| 2008/0215684 | A1* | 9/2008 | Thorkelsson .......... H04L 69/08 709/206 |
| 2008/0250084 | A1 | 10/2008 | Polimeni |
| 2008/0256193 | A1* | 10/2008 | Kamat .................. G06Q 10/107 709/206 |
| 2012/0149342 | A1 | 6/2012 | Cohen et al. |
| 2014/0172993 | A1* | 6/2014 | Ordogh ................... H04L 51/36 709/206 |
| 2015/0341300 | A1 | 11/2015 | Swain et al. |
| 2016/0269335 | A1 | 9/2016 | Kell |
| 2018/0351900 | A1 | 12/2018 | Kell et al. |

OTHER PUBLICATIONS

Author Unknown, "Rich Communication Suite 5.3 Advanced Communications Services and Client Specification," Official Document RCC.07, Version 6.0, Feb. 28, 2015, GSM Association, 546 pages.

Author Unknown, "CPM Message Storage," Draft Version 2.0, Open Mobile Alliance Ltd., OMA-TS-CPM_MessageStorage-V2_0-20130723-D, Jun. 23, 2013, 48 pages.

Author Unknown, "CPM Message Storage," Candidate Version 2.0, Open Mobile Alliance Ltd., OMA-TS-CPM_Message_Storage-V2_0-20150113-C, Jan. 13, 2015, 55 pages.

Author Unknown, "Dictionary for OMA Specifications," Approved Version 2.9, Open Mobile Alliance Ltd., OMA-ORG-Dictionary-V2_9-20120626-A, Jun. 26, 2012, 46 pages.

Author Unknown, "OMA Converged IP Messaging System Description," Candidate Version 2.0, Open Mobile Alliance Ltd., OMA-TS-CPM_System_Description-V2_0-20150113-C, Jan. 13, 2015, 132 pages.

Crispin, M., "Internet Message Access Protocol—Version 4rev1 (IMAPv4)," Network Working Group, Request for Comments: 3501, Obsoletes: 2060, Category: Standards Track, the Internet Society, Mar. 2003, 108 pages.

Gordon, W., "How to Use Gmail as Your Central, Universal Communications Hub," lifehacker, Dec. 15, 2010, "https://lifehacker.com/5713726/how-to-use-gmail-as-your-central-universal-communications-hub," retrieved Jan. 18, 2016, 10 pages.

Gossage, M., "Optimizing Outlook 2007 Cache Mode Performance for a Very Large Mailbox," The Exchange Team Blog, TechNet Blogs, Dec. 17, 2007, http://blogs.technet.com/b/exchange/archive/2007/12/17/3404552.aspx, retrieved Nov. 6, 2015, 7 pages.

Last Name Unknown, Jonathan, "What are the default special folder names for IMAP accounts in Mail.app (like Drafts, Junk, Sent)?" AskDifferent, Stack Exchange, Oct. 13, 2013, https://apple/stackexchange.com/questions/105145/what-are-the-default-special-folder-names-for-imap-accounts-in-mail-app-like-dr/105145, retrieved May 15, 2018, 2 pages.

Leiba, B. et al., "IMAP LIST Extension for Special-Use Mailboxes," Internet Engineering Task Force (IETF), Request for Comments: 6154, Category: Standards Track, ISSN: 2070-1721, Mar. 2011, 12 pages.

Leiba, B. et al., "Internet Message Access Protocol version 4—LIST Command Extensions," Internet Engineering Task Force (IETF), Network Working Group, Request for Comments: 5258, Obsoletes: 3348, Updates: 2193, Category: Standards Track, The Internet Society, Jun. 2008, 31 pages.

Melnikov, A. et al., "Collected Extensions to IMAP4 ABNF," Internet Engineering Task Force (IETF), Request for Comments: 4466, Updates: 2088, 2342, 3501, 3502, 3516, Category: Standards Track, Apr. 2006, 17 pages.

Melnikov, A. et al., "IMAP Extensions: Quick Flag Changes Resynchroniztion (CONDSTORE) and Quick Mailbox Resynchronization (QRESYNC)," Internet Engineering Task Force (IETF), Request for Comments: 7162, Obsoletes: 4551, 5162, Updates: 2683, Category: Standards Track, ISSN: 2070-1721, May 2014, 52 pages.

Melnikov, A. et al., "IMAP4 Extension for Returning STATUS Information in Extended LIST," Internet Engineering Task Force (IETF), Request for Comments: 5819, Category: Standards Track, ISSN: 2070-1721, Mar. 2010, 6 pages.

Melnikov, A. et al., "IMAP4 Keyword Registry," Internet Engineering Task Force (IETF), Request for Comments: 5788, Category: Standards Track, ISSN: 2070-1721, Mar. 2010, 11 pages.

International Search Report and Written Opinion for International Patent Application No. PCT/IB2015/058904, dated May 9, 2016, 12 pages.

International Search Report and Written Opinion for International Patent Application No. PCT/IB2016/051036, dated Nov. 23, 2016, 13 pages.

Author Unknown, "Technical Specification Group Core Network and Terminals; IP multimedia call control protocol based on Session Initiation Protocol (SIP) and Session Description Protocol (SDP); Stage 3 (Release 15)," Technical Specification 24.229, Version 15.3.0, 3GPP Organizational Partners, Jun. 2018, 1019 pages.

Author Unknown, "CPM Message Storage using RESTFul API," Draft Version 2.0, Open Mobile Alliance Ltd., OMA-TS-CPM_Message_Storage_Using_RESTFul_API-V2_0-20180510-D, May 10, 2018, 44 pages.

Daboo, C. et al., "Internet Message Access Protocol—ANNOTATE Extension," Internet Engineering Task Force (IETF), Network Working Group, Request for Comments: 5257, Jun. 2008, 31 pages.

Daboo, C., "The IMAP METADATA Extension," Internet Engineering Task Force (IETF), Network Working Group, Request for Comments: 5464, Feb. 2009, 21 pages.

Rosenberg, J. et al., "SIP: Session Initiation Protocol," Internet Engineering Task Force (IETF), Request for Comments: 3261, Categorgy: Standards Track, Jun. 2002, 269 pages.

* cited by examiner ical Field

The present disclosure relates to managing specialized objects in a message store such as, e.g., a Common Message Store (CMS) for Rich Communication Services (RCS)/Converged Internet Protocol Messaging (CPM).

BACKGROUND

The Rich Communication Services (RCS) program is a Global System for Mobile Communications, originally Groupe Speciale Mobile, (GSM) Association (GSMA) program for the creation of inter-operator communication services based on Internet Protocol (IP) Multimedia Subsystem (IMS). RCS is a platform that enables the delivery of communication experiences beyond voice and Short Message Service (SMS). In particular, RCS provides users with services, such as instant messaging or chat, live video, and filing sharing, across various devices on any network. Among other things, the RCS architecture includes an IMS core including a Common Message Store (CMS). RCS has endorsed Open Mobile Alliance (OMA) Converged IP Messaging (CPM) and, as such, the CMS is sometimes referred to herein as an OMA CPM message store (or simply a CPM message store) or a CPM/RCS message store. The details of the RCS architecture and RCS in general are currently specified in "Rich Communication Suite 5.3 Advanced Communications Services and Client Specification" Version 6.0 (Feb. 28, 2015). The details of the OMA CPM message store are currently specified in "CPM Message Storage" Candidate Version 2.0 (Jan. 13, 2015).

The OMA CPM standards group is currently working to define how enriched calling features may be stored into the CPM CMS in order to provide a consistent multi-device communication experience for users. In particular, the OMA CPM standards group is trying to decide how best to store and access enriched calling-related objects into the CPM CMS in order to make records such as call logs and Visual Voicemail (VVM) readily available to all of a user's devices in a consistent way, and aligned in near real time. The current standardization approach is to store such objects in their own hierarchical storage areas in the CMS as part of the user archive. This approach makes for at least a two-fold increase in the total number of folders to be managed in the CMS and, more specifically, the equivalently larger number of mailboxes to be managed by an Internet Message Access Protocol (IMAP) client. The number of mailboxes to be synchronized, and the need for some clients to present a consistent interleaved history of all communications between the subscriber and each of their contacts, makes the management of these objects in separate folders challenging and potentially non-optimal.

The IMAP Protocol (M. Crispin, "Internet Message Access Protocol—Version 4rev1," Internt Engineering Task Force (IETF) Request for Comments 3501, March 2003 (hereinafter "RFC3501") is utilized for communication between the IMAP client hosted by a client device of a subscriber and the CMS (which is an IMAP server). The IMAP Protocol has many extensions published by the IETF to improve the basic functionality of the protocol. Some of these extensions are specifically aimed at improving the efficiency of synchronization of an IMAP client device with the contents of an IMAP server. Three such extensions are B. Leiba et al., "Internet Message Access Protocol version 4—LIST Command Extensions," Network Working Group Request for Comments 5258, June 2008 (hereinafter "RFC5258") (aka LIST-EXTENDED), A. Melnikov et al., "IMAP4 Extension for Returning STATUS Information in Extended LIST," IETF Request for Comments 5819, March 2010 (hereinafter "RFC5819") (aka LIST-STATUS), and A. Melnikov et al., "IMAP Extensions: Quick Flag Changes Recynchronization (CONDSTORE) and Quick Mailbox Resynchronization (QRESYNC)," IETF Reqest for Comments 7162, May 2014 (hereinafter "RFC7162") (aka CONDSTORE & QRESYNC).

RFC5258 (aka LIST-EXTENDED) introduced an extended syntax for the IMAP LIST operation which returns, in a LIST response, a list of mailboxes in the IMAP server. The LIST-EXTENDED extension also introduced the concept of constraining the resulting list based on "Selection options". RFC5258 defines the Selection options SUBSCRIBED, REMOTE, and RECURSIVEMATCH, none of which is appropriate for finding mailboxes based on their content.

RFC5819 (aka LIST-STATUS) published a specific extension of the LIST command, which returns STATUS information for each mailbox in the LIST response, without the client having to separately query the server for the STATUS of each mailbox. The returned status can indicate five things: MESSAGES, RECENT, UIDNEXT, UIDVALIDITY, and UNSEEN. Basically all of these status indicators give hints about new or changed mailbox content, although they do not specifically indicate what has changed, except that an increase in UIDNEXT means that new messages have arrived in the mailbox (though they might already be gone by this point). Once the status indicators for all of the mailboxes accessible by the user are received by the client device, the client device must analyze them and determine which mailboxes contain new or modified messages.

SUMMARY

Systems and methods are disclosed herein that enable a client device to efficiently identify mailboxes containing objects (e.g., messages) of interest (e.g., of a specific type(s) and/or having a specific attribute(s)) in a server-based message store. In some embodiments, a method of operation of a client device comprises sending a single request to a server for a list of mailboxes maintained by the server for a user that contain objects flagged with any of one or more flags specified in the single request. The method of operation of the client device further comprises, in response to the single request, receiving, from the server, the list of mailboxes maintained by the server for the user that contain objects flagged with any of the one or more flags specified in the single request. The method also comprises processing the list of mailboxes. By utilizing a single request, the client device is enabled to quickly and efficiently identify which mailboxes of the user contain objects of interest.

In some embodiments, the one or more flags specified in the single request comprise a Visual Voicemail Message Waiting Indication (VVMMWI) flag. Further, in some embodiments, the method comprises clearing the VVM-MWI flag, e.g., after the user has accessed the VVM on the client device.

In some embodiments, the one or more flags specified in the single request comprise a VVMMWI flag, and processing the list of mailboxes comprises, for each mailbox in the list of mailboxes, displaying a VVMMWI in association with an indication of the respective contact of the user.

In some embodiments, sending the single request comprises sending an Internet Message Access Protocol (IMAP) LIST request comprising a selection option that specifies the one or more flags including the VVMMWI flag to thereby restrict the list of mailboxes returned in response to the IMAP LIST request to the mailboxes maintained by the server for the user that contain objects flagged with any of the one or more flags.

In some embodiments, sending the single request comprises sending the single request to the server for: the list of mailboxes maintained by the server for the user that contain objects flagged with any of the one or more flags specified in the single request and, for each mailbox in the list of mailboxes flagged with the one or more flags specified in the single request, the number of objects in the mailbox that are flagged with each of one or more second flags specified in the single request. In some embodiments, the one or more second flags are the same as the one or more flags. In other embodiments, the one or more second flags are different, as a set, than the one or more flags.

In some embodiments, the one or more flags specified in the single request comprise a VVMMWI flag, and the one or more second flags specified in the single request comprise the VVMMWI flag. Further, processing the list of mailboxes comprises, for each mailbox in the list of mailboxes, displaying a VVMMWI in association with an indication of the respective contact of the user such that the VVMMWI indicates a number of messages in the respective mailbox that are flagged with the VVMMWI flag.

In some embodiments, sending the single request comprises sending an IMAP LIST request comprising: (a) a selection option that specifies the one or more flags including the VVMMWI flag to thereby restrict the list of mailboxes returned in response to the IMAP LIST request to the mailboxes maintained by the server for the user that contain objects flagged with any of the one or more flags and (b) a STATUS return option comprising a status item that specifies one or more second flags including the VVMMWI flag to thereby request that the server return, for each mailbox in the list of mailboxes returned in response to the IMAP LIST request, the number of objects in the mailbox that are flagged with each of the one or more second flags.

In some embodiments, the single request is an IMAP LIST request that uses a syntax that enables the IMAP LIST request to request the list of mailboxes maintained by the server for the user that contain objects flagged with any of the one or more flags specified in the single request.

In some embodiments, sending the single request comprises sending an IMAP LIST request comprising a KEYWORD selection option that specifies the one or more flags to thereby restrict the list of mailboxes returned in response to the IMAP LIST request to the mailboxes maintained by the server for the user that contain objects flagged with the one or more flags.

In some embodiments, sending the single request comprises sending an IMAP LIST request comprising: (a) a selection option that specifies the one or more flags to thereby restrict the list of mailboxes returned in response to the IMAP LIST request to the mailboxes maintained by the server for the user that contain objects flagged with any of the one or more flags and (b) a STATUS return option comprising a status item that specifies one or more second flags to thereby request that the server return, for each mailbox in the list of mailboxes returned in response to the IMAP LIST request, the number of objects in the mailbox that are flagged with each of the one or more second flags. Further, in some embodiments, the one or more second flags are the same as the one or more flags specified in the selection option of the LIST command. In other embodiments, the one or more second flags are different, as a set, than the one or more flags specified in the selection option of the LIST command.

In some embodiments, for each mailbox, a communication history comprised in the mailbox comprises at least two of a group consisting of: a call log between the user and the respective contact of the user, text message exchanges between the user and the respective contact of the user, and Visual Voicemail (VVM) messages from the respective contact of the user to the user.

Embodiments of a client device are also disclosed. In some embodiments, a client device comprises a communication interface, one or more processors, and memory storing instructions that are executable by the one or more processors whereby the client device is operable to: send, via the communication interface, a single request to a server for a list of mailboxes maintained by the server for a user that contain objects flagged with any of one or more flags specified in the single request; receive, from the server via the communication interface in response to the single request, the list of mailboxes maintained by the server for the user that contain objects flagged with any of the one or more flags specified in the single request; and process the list of mailboxes.

In some embodiments, the one or more flags specified in the single request comprise a VVMMWI flag.

In some embodiments, the client device is further operable to clear the VVMMWI flag.

In some embodiments, the client device is further configured to, as part of processing the list of mailboxes, for each mailbox in the list of mailboxes, display a VVMMWI in association with an indication of the respective contact of the user.

In some embodiments, the single request is an IMAP LIST request comprising a selection option that specifies the one or more flags including the VVMMWI flag to thereby restrict the list of mailboxes returned in response to the IMAP LIST request to the mailboxes maintained by the server for the user that contain objects flagged with any of the one or more flags.

In some embodiments, the single request is for: (a) the list of mailboxes maintained by the server for the user that contain objects flagged with any of the one or more flags specified in the single request and (b) for each mailbox in the list of mailboxes flagged with the one or more flags specified in the single request, the number of objects in the mailbox that are flagged with each of one or more second flags specified in the singe request. In some embodiments, the one or more second flags are the same as the one or more flags. In other embodiments, the one or more second flags are different, as a set, than the one or more flags.

In some embodiments, the one or more flags specified in the single request comprise a VVMMWI flag, and the one or more second flags specified in the single request comprise the VVMMWI flag. The client device is further configured to, as part of processing the list of mailboxes, for each mailbox in the list of mailboxes, display a VVMMWI in association with an indication of the respective contact of the user such that the VVMMWI indicates a number of objects in the respective mailbox that are flagged with the VVMMWI flag.

In some embodiments, the single request is an IMAP LIST request comprising: (a) a selection option that specifies the one or more flags including the VVMMWI flag to thereby restrict the list of mailboxes returned in response to the IMAP LIST request to the mailboxes maintained by the server for the user that contain objects flagged with any of the one or more flags and (b) a STATUS return option comprising a status item that specifies the one or more second flags including the VVMMWI flag to thereby request that the server return, for each mailbox in the list of mailboxes returned in response to the IMAP LIST request, the number of objects in the mailbox that are flagged with each of the one or more second flags.

In some embodiments, the single request is an IMAP LIST request that uses a syntax that enables the IMAP LIST request to request the list of mailboxes maintained by the server for the user that contain objects flagged with any of the one or more flags specified in the single request.

In some embodiments, the single request is an IMAP LIST request comprising a selection option that specifies the one or more flags to thereby restrict the list of mailboxes returned in response to the IMAP LIST request to the mailboxes maintained by the server for the user that contain objects flagged with the one or more flags.

In some embodiments, the single request is an IMAP LIST request comprising: (a) a selection option that specifies the one or more flags to thereby restrict the list of mailboxes returned in response to the IMAP LIST request to the mailboxes maintained by the server for the user that contain objects flagged with any of the one or more flags and (b) a STATUS return option comprising a status item that specifies one or more second flags to thereby request that the server return, for each mailbox in the list of mailboxes returned in response to the IMAP LIST request, the number of objects in the mailbox that are flagged with each of the one or more second flags. In some embodiments, the one or more second flags are the same as the one or more flags specified in the selection option of the LIST command. In other embodiments the one or more second flags are different, as a set, than the one or more flags specified in the selection option of the LIST command.

In some embodiments, for each mailbox, the communication history comprised in the mailbox comprises at least two of a group consisting of: a call log between the user and the respective contact of the user, text message exchanges between the user and the respective contact of the user, and visual voice mail messages from the respective contact of the user to the user.

In some embodiments, a client device is adapted to operate according to any of the embodiments of the method of operation of the client device described above.

In some embodiments, a client device comprises means for sending a single request to a server for a list of mailboxes maintained by the server for a user that contain objects flagged with any of one or more flags specified in the single request; means for, in response to the single request, receiving, from the server, the list of mailboxes maintained by the server for the user that contain objects flagged with any of the one or more flags specified in the single request; and means for processing the list of mailboxes.

In some embodiments, a client device comprises a request module operable to send a single request to a server for a list of mailboxes maintained by the server for a user that contain objects flagged with any of one or more flags specified in the single request and a response processing module operable to, in response to the single request, receive, from the server, the list of mailboxes maintained by the server for the user that contain objects flagged with any of the one or more flags specified in the single request. The response processing module is further operable to process the list of mailboxes.

In some embodiments, a computer readable medium stores instructions executable by at least one processor of a client device to thereby instruct the client device to send a single request to a server for a list of mailboxes maintained by the server for a user that contain objects flagged with any of one or more flags specified in the single request, receive, from the server in response to the single request, the list of mailboxes maintained by the server for the user that contain objects flagged with any of the one or more flags specified in the single request, and process the list of mailboxes.

In some embodiments, a computer program is provided, where the computer program comprises instructions which, when executed on at least one processor, cause the at least one processor to carry out any of the embodiments of the method of operation of the client device described above. Embodiments of a carrier containing the computer program are also disclosed, wherein the carrier is one of an electronic signal, an optical signal, a radio signal, or a computer readable storage medium.

Embodiments of a method of operation of a server system are also disclosed. In some embodiments, a method of operation of a server system comprises receiving a single request from a client device for a list of mailboxes maintained by the server system for a user that contain objects flagged with any of one or more flags specified in the single request, wherein the server system maintains a plurality of mailboxes for the user. The method further comprises processing the single request to determine the list of mailboxes maintained by the server system for the user that contain objects flagged with any of one or more flags specified in the single request and sending, to the client device, the list of mailboxes maintained by the server for the user that contain objects flagged with any of the one or more flags specified in the single request.

In some embodiments, each mailbox of the plurality of mailboxes of the user is a converged mailbox comprising a communication history for communication between the user and a respective contact of the user.

In some embodiments, the one or more flags specified in the single request comprise a VVMMWI flag.

In some embodiments, receiving the single request comprises receiving an IMAP LIST request comprising a selection option that specifies the one or more flags including the VVMMWI flag to thereby restrict the list of mailboxes returned in response to the IMAP LIST request to the list of mailboxes maintained by the server for the user that contain objects flagged with any of the one or more flags.

In some embodiments, receiving the single request comprises receiving the single request for: (a) the list of mailboxes maintained by the server for the user that contain objects flagged with any of the one or more flags specified in the single request and (b) for each mailbox in the list of mailboxes flagged with the one or more flags specified in the single request, the number of objects in the mailbox that are flagged with each of one or more second flags specified in the single request.

In some embodiments, the one or more flags specified in the single request comprise a VVMMWI flag, and the one or more second flags specified in the single request comprise the VVMMWI flag. Further, receiving the single request comprises receiving an IMAP LIST request comprising: (a)

a selection option that specifies the one or more flags including the VVMMWI flag to thereby restrict the list of mailboxes returned in response to the IMAP LIST request to the list of mailboxes maintained by the server for the user that contain objects flagged with any of the one or more flags and (b) a STATUS return option comprising a status item that specifies the one or more second flags including the VVMMWI flag to thereby request that the server return, for each mailbox in the list of mailboxes returned in response to the IMAP LIST request, the number of objects in the mailbox that are flagged with each of the one or more second flags.

In some embodiments, the single request is an IMAP LIST request that uses a syntax that enables the IMAP LIST request to request the list of mailboxes maintained by the server for the user that contain objects flagged with any of the one or more flags specified in the single request.

In some embodiments, receiving the single request comprises receiving an IMAP LIST request comprising a selection option that specifies the one or more flags to thereby restrict the list of mailboxes returned in response to the IMAP LIST request to the mailboxes maintained by the server for the user that contain objects flagged with any of the one or more flags.

In some embodiments, receiving the single request comprises receiving an IMAP LIST request comprising (a) a selection option that specifies the one or more flags to thereby restrict the list of mailboxes returned in response to the IMAP LIST request to the mailboxes maintained by the server for the user that contain objects flagged with any of the one or more flags and (b) a STATUS return option comprising a status item that specifies one or more second flags to thereby request that the server return, for each mailbox in the list of mailboxes returned in response to the IMAP LIST request, the number of objects in the mailbox that are flagged with each of the one or more second flags.

In some embodiments, for each mailbox of the plurality of mailboxes of the user, the communication history comprised in the mailbox comprises at least two of a group consisting of: a call log between the user and the respective contact of the user, text message exchanges between the user and the respective contact of the user, and VVM messages from the respective contact of the user to the user.

Embodiments of a server system are also disclosed. In some embodiments, the server system comprises a communication interface, one or more processors, and memory storing instructions that are executable by the one or more processors whereby the server system is operable to: (a) receive, via the communication interface, a single request from a client device for a list of mailboxes maintained by the server system for a user that contain objects flagged with any of one or more flags specified in the single request, wherein the server system maintains a plurality of mailboxes for the user, (b) process the single request to determine the list of mailboxes maintained by the server system for the user that contain objects flagged with any of the one or more flags specified in the single request, and (c) send, to the client device via the communication interface, the list of mailboxes maintained by the server for the user that contain objects flagged with any of the one or more flags specified in the single request.

In some embodiments, each mailbox of the plurality of mailboxes of the user is a converged mailbox comprising a communication history for communication between the user and a respective contact of the user.

In some embodiments, the one or more flags specified in the single request comprise a VVMMWI flag. Further, in some embodiments, the single request is an IMAP LIST request comprising a selection option that specifies the one or more flags including the VVMMWI flag to thereby restrict the list of mailboxes returned in response to the IMAP LIST request to the mailboxes maintained by the server for the user that contain objects flagged with any of the one or more flags.

In some embodiments, the single request is for: (a) the list of mailboxes maintained by the server for the user that contain objects flagged with any of the one or more flags specified in the single request and (b) for each mailbox in the list of mailboxes flagged with the one or more flags specified in the single request, the number of objects in the mailbox that are flagged with each of one or more second flags specified in the single request. Further, in some embodiments, the one or more flags specified in the single request comprise a VVMMWI flag, and the one or more second flags specified in the single request comprise the VVMMWI flag. Further, the single request is an IMAP LIST request comprising: (a) a selection option that specifies the one or more flags including the VVMMWI flag to thereby restrict the list of mailboxes returned in response to the IMAP LIST request to the mailboxes maintained by the server for the user that contain objects flagged with any of the one or more flags and (b) a STATUS return option comprising a status item that specifies the one or more second flags including the VVM-MWI flag to thereby request that the server return, for each mailbox in the list of mailboxes returned in response to the IMAP LIST request, the number of objects in the mailbox that are flagged with each of the one or more second flags.

In some embodiments, the single request is an IMAP LIST request that uses a syntax that enables the IMAP LIST request to request the list of mailboxes maintained by the server for the user that contain objects flagged with any of the one or more flags specified in the single request.

In some embodiments, the single request is an IMAP LIST request comprising a selection option that specifies the one or more flags to thereby restrict the list of mailboxes returned in response to the IMAP LIST request to the mailboxes maintained by the server for the user that contain objects flagged with any of the one or more flags.

In some embodiments, the single request is an IMAP LIST request comprising: (a) a selection option that specifies the one or more flags to thereby restrict the list of mailboxes returned in response to the IMAP LIST request to the mailboxes maintained by the server for the user that contain objects flagged with any of the one or more flags and (b) a STATUS return option comprising a status item that specifies one or more second flags to thereby request that the server return, for each mailbox in the list of mailboxes returned in response to the IMAP LIST request, the number of objects in the mailbox that are flagged with each of the one or more second flags.

In some embodiments, for each mailbox of the plurality of mailboxes of the user, the communication history comprised in the mailbox comprises at least two of a group consisting of: a call log between the user and the respective contact of the user, text message exchanges between the user and the respective contact of the user, and VVM messages from the respective contact of the user to the user.

In some embodiments, a server system is adapted to operate according to any of the embodiments of the method of operation of the server system described above.

In some embodiments, a server system comprises means for receiving a single request from a client device for a list of mailboxes maintained by the server system for a user that contain objects flagged with any of one or more flags specified in the single request, wherein the server system maintains a plurality of mailboxes for the user. The server system further comprises means for processing the single request to determine the list of mailboxes maintained by the server system for the user that contain objects flagged with any of the one or more flags specified in the single request and means for sending, to the client device, the list of mailboxes maintained by the server system for the user that contain objects flagged with any of the one or more flags specified in the single request.

In some embodiments, a server system comprises a list request processing module operable to: receive a single request from a client device for a list of mailboxes maintained by the server system for a user that contain objects flagged with any of one or more flags specified in the single request, wherein the server system maintains a plurality of mailboxes for the user; process the single request to determine the list of mailboxes maintained by the server system for the user that contain objects flagged with any of the one or more flags specified in the single request; and send, to the client device, the list of mailboxes maintained by the server system for the user that contain objects flagged with any of the one or more flags specified in the single request.

In some embodiments, a computer readable medium is provided, where the computer readable medium stores instructions executable by at least one processor of a server system to thereby instruct the server system to: receive a single request from a client device for a list of mailboxes maintained by the server system for a user that contain objects flagged with any of the one or more flags specified in the single request, wherein the server system maintains a plurality of mailboxes for the user; process the single request to determine the list of mailboxes maintained by the server system for the user that contain objects flagged with any of the one or more flags specified in the single request; and send, to the client device, the list of mailboxes maintained by the server system for the user that contain objects flagged with any of the one or more flags specified in the single request.

Embodiments of a computer program are also disclosed in which the computer program comprises instructions which, when executed on at least one processor, cause the at least one processor to carry out the method of operation of a server system described above. In some embodiments, a carrier containing the computer program is disclosed, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
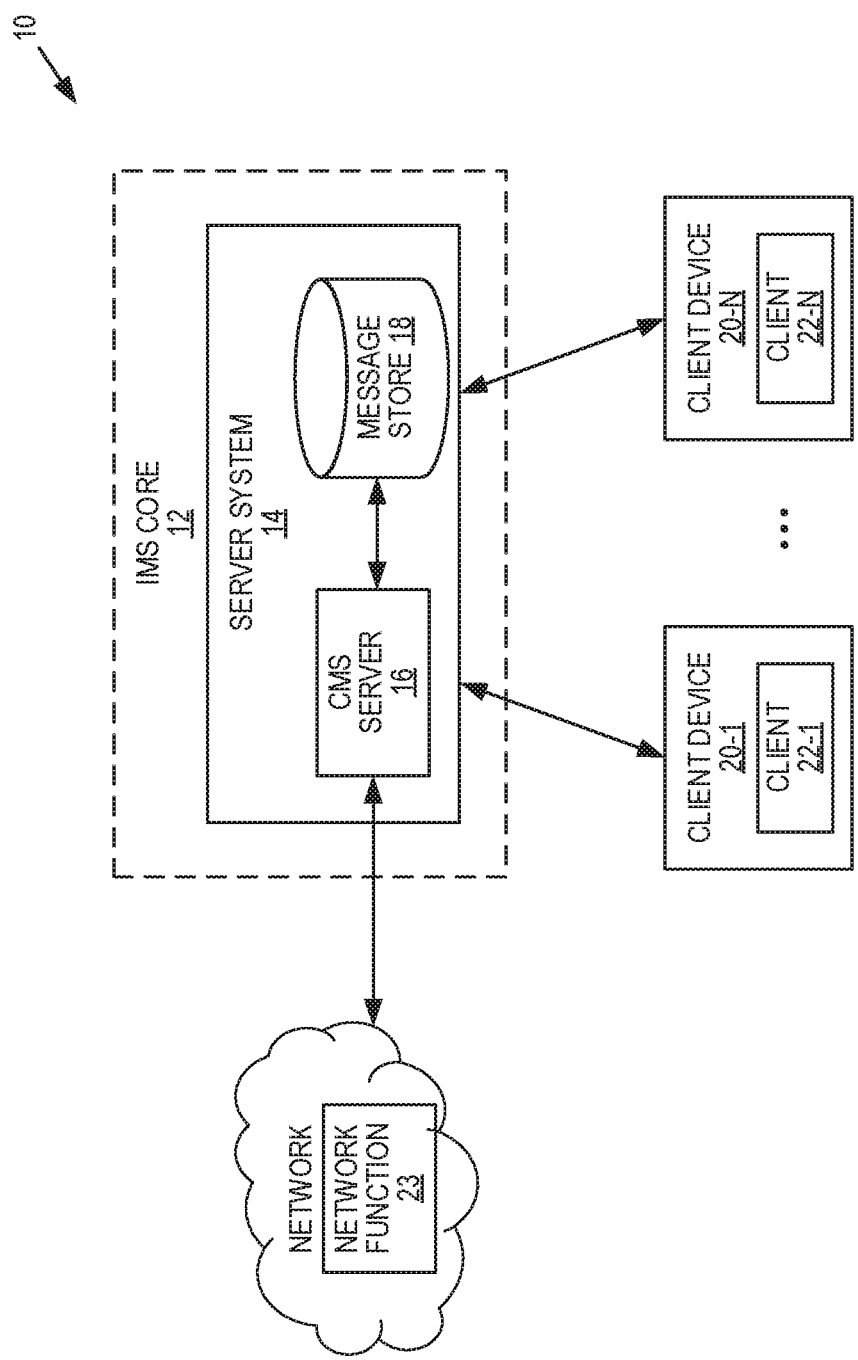
FIG. 1 illustrates a system implementing one example of a Rich Communication Services (RCS) architecture according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The Open Mobile Alliance (OMA) Converged Internet Protocol (IP) Messaging (CPM) standards group is currently working to define how enriched calling features may be stored into the CPM Common Message Store (CMS) in order to provide a consistent multi-device communication experience for users. In particular, the OMA CPM standards group is trying to decide how best to store and access enriched calling-related objects into the CPM CMS in order to make records such as call logs and Visual Voicemail (VVM) readily available to all of a user's devices in a consistent way, and aligned in near real time. The current standardization approach is to store such objects in their own hierarchical storage areas in the CMS as part of the user archive. This approach makes for at least a two-fold increase in the total number of folders to be managed in the CMS, and more specifically, the equivalently larger number of mailboxes to be managed by an Internet Message Access Protocol (IMAP) client. The number of mailboxes to be synchronized, and the need for some clients to present a consistent interleaved history of all communications between the subscriber and each of their contacts makes the management of these objects in separate folders challenging and potentially non-optimal.

Embodiments are disclosed herein that utilize a single folder (e.g., "Default") to converge all communication history (e.g., call log, text message exchanges, visual voice mail messages, etc.) between a subscriber (i.e., a user) and a respective contact of that subscriber. This single folder is managed as a single IMAP mailbox. A separate folder, and thus a separate IMAP mailbox, is maintained for each contact of the subscriber. Using a single, converged IMAP mailbox for all communication history between the subscriber and the respective contact introduces challenges for some clients. In particular, some clients will need a very efficient way to find specific types of stored objects, or messages, in order to provide very rapid feedback to the subscriber about new information in the communication histories between the subscriber and his/her contacts. For example, a client device may provide message waiting indications for VVM messages (referred to herein as VVM Message Waiting Indicators, or Indications, (MWIs) (VVM-MWIs)). Thus, there is a need for an efficient mechanism by which the client device can obtain information regarding new VVMs from the CMS/IMAP server (e.g., contacts from which the subscriber has waiting, or new, VVMs and the number of VVMs waiting for the subscriber from respective contacts of the subscriber).

Systems and methods are disclosed herein that enable a client device to efficiently identify mailboxes containing objects (e.g., messages) of interest (e.g., of a specific type(s) and/or having a specific attribute(s)). In some embodiments, the disclosed functionality is provided via an extension to the IMAP Protocol. In some embodiments, the extension to the IMAP Protocol disclosed herein enables efficient management of conversation histories in a minimal set of mailboxes.

More specifically, in some embodiments, at least some objects are stored in a CMS with a flag(s) that identifies the objects as being of a specific type(s) and/or as having a specific attribute(s). For example, as discussed below in detail, VVM messages are stored in the CMS with, e.g., a first flag (e.g., a VVM flag) that identifies the messages as VVM messages and a second flag (e.g., a MWI flag) that identifies the messages as new, or waiting, VVM messages. The flag(s) enable objects of interest (e.g., objects of a specific type(s) and/or having a specific attribute(s)) to be quickly found within a mailbox. Using the flag(s) and, in some embodiments, an extension to the IMAP Protocol, a client device is enabled to query the CMS to identify all mailboxes (and thus contacts of the subscriber) that include one or more objects that are flagged with any of one or more specified flags and, in some embodiments, the number of messages in each of those mailboxes that are flagged with the specified flag(s).

In this regard, FIG. 1 illustrates a system 10 implementing one example of a Rich Communication Services (RCS) architecture according to some embodiments of the present disclosure. It should be appreciated that the RCS architecture may be much more complex and include additional components. However, the RCS architecture of the system 10 of FIG. 1 is intended as an example used to illustrate embodiments of the present disclosure. Also, it should be noted that while the discussion herein focuses on RCS/CPM, the present disclosure is equally applicable to other types of systems in which there is a CMS.

As illustrated, the system 10 includes an IP Multimedia Subsystem (IMS) core 12 including a server system 14. Notably, RCS may support operation across multiple IMS cores 12 of multiple service providers. The server system 14 includes a CMS server 16 that operates to maintain, in this example, a message store 18 for one or more users (typically for many users). Notably, the message store 18 is, at least in some preferred embodiments described herein, a CMS and, in particular, a CMS as defined by OMA CPM (and as generally endorsed by Global System for Mobile Communications Association (GSMA) RCS), which is specifically referred to herein as a CPM CMS. However, the message store 18 is not limited to a CPM CMS, but may more generally be any type of CMS.

The server system 14 may be implemented as a single server computer (which includes processor(s), memory, etc.) or as multiple server computers (each including its own processor(s), memory, etc.) that operate in a collaborative manner, e.g., for purposes of load sharing and/or redundancy. The CMS server 16 is, at least in some embodiments, implemented in software. For example, the CMS server 16 may be implemented as software hosted on the server system 14, where the server system 14 is an enterprise-scale general computing platform such as a Unix server, a cluster of Unix servers, or a virtualized (cloud) server environment.

The system 10 also includes client devices 20-1 through 20-N (generally referred to herein collectively as client devices 20 and individually as client device 20). The client devices 20 may include smart phones, tablet computers, personal computers, and/or the like. In general, the client devices 20 may include any devices that are capable of communicating directly or indirectly with the server system 14 (e.g., through a $3^{rd}$ Generation Partnership Project (3GPP) radio access network, a Wi-Fi network, fixed access internet connections, or the like). The client devices 20-1 through 20-N include respective clients 22-1 through 22-N (generally referred to herein collectively as clients 22 and individually as client 22).

The clients 22 are implemented in software and operate to communicate with the CMS server 16 for purposes of, e.g., synchronizing mailboxes, as described below. Note that a particular user may own or operate multiple client devices 20, and the respective clients 22 operate, together with the CMS server 16, to synchronize mailboxes of that user in the message store 18 across the multiple client devices 20 of that user.

The CMS server 16 receives objects (e.g., messages) for storage in the message store 18. The CMS server 16 receives these objects either from a network function 23 or from the client devices 20.

Client access to the CMS server 16 is achieved via a protocol for synchronizing messages stored in the message store 18 with a local copy of these messages on the client device 20. For a CPM CMS, the current reference protocol is IMAP, though a web services interface is also specified. Specifically, client/server interaction is typically via the IMAP Protocol over a secure Transport Layer Security (TLS) connection. The preferred embodiments described herein relate to an extension of IMAP version 4.1 (IMAPv4.1) that enables the client device 20, or more specifically the client 22 operating on the client device 20, to use a single IMAP request to obtain: (a) a list of mailboxes of the respective user that contain objects of a specified type(s) and, in some embodiments, (b) the number of objects in each of those mailboxes that are of the specified type(s). The object type(s) are indicated by respective flags. The disclosed extension of IMAPv4.1 affects both the client 22 and the CMS server 16 involved in the exchange. Note, however, that the concepts described herein are generally applicable to a CMS interface expressed through a different protocol.

The system 10 also includes the network function 23. In some embodiments, the network function 23 communicates with the CMS server 16 to store objects (e.g., VVM messages) into the message store 18 with one or more flags, as discussed below in detail. The network function 23 may be, for example, a Performing Function (PF) or VVM server of the Enriched Messaging solution, as specified by OMA CPM and/or GSMA RCS.

Embodiments described herein relate to the synchronization of messages in scenarios where a user has multiple client devices 20, such as is the case in CPM/RCS. However, after initial synchronization to get the client devices 20 roughly aligned with each other, the typical synchronization process will involve few updates, and will normally be focused in a very small number of folders/mailboxes out of a total set of many more folders/mailboxes of the user.

It is envisioned that at least some of the client devices 20, or at least some applications running on the client device 20, may be interested in only some of the objects stored in the mailboxes of the user. For example, some client devices 20 may desire to frequently determine whether there are new VVM messages for the user in order to update VVMMWIs at the client device 20. These VVMMWIs may take any form but, in general, are indicators of the contact(s) from which the user has a new VVM message(s) and the number of new VVM messages that the user has received from each contact.

Figure 2:
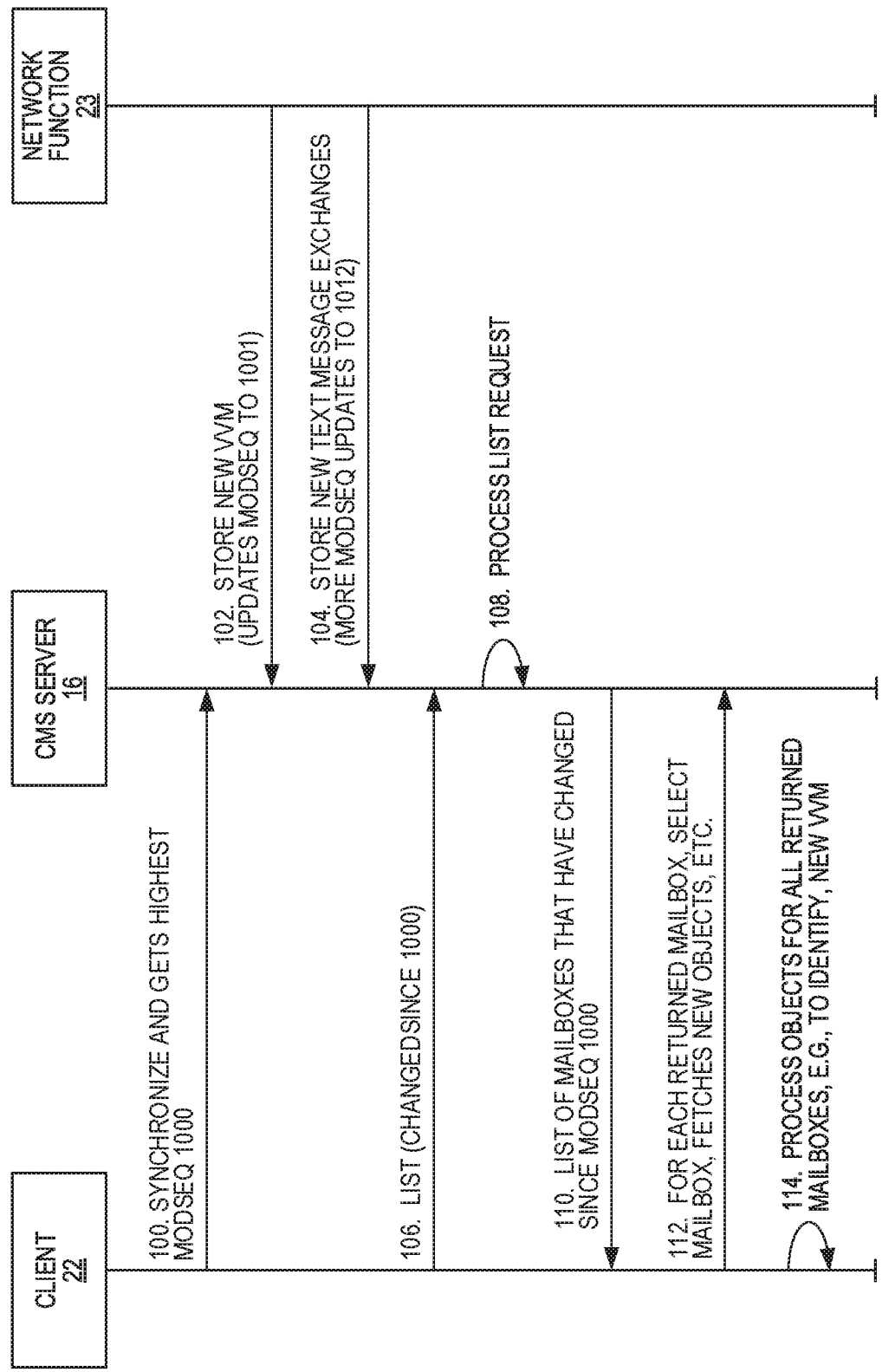
FIG. 2 illustrates a conventional Internet Message Access Protocol (IMAP) procedure for obtaining information regarding messages of interest in a number of converged mailboxes of a user.

Using conventional techniques, and in particular conventional IMAP procedures, frequent updating of the VVM-MWIs at the client device 20 requires a significant amount of signaling between the client 22 and the CMS server 16. In particular, as illustrated in FIG. 2, the client 22 first synchronizes with the CMS server 16 and gets a highest modification sequence attribute (MODSEQ) value among all mailboxes of the user, which for this example is 1000 (step 100). This synchronization synchronizes the mailboxes of the user at the client 22 with those of the user in the message store 18. Sometime thereafter, the network function 23 stores a new VVM message from a contact of the user into the respective mailbox (step 102). MODSEQ is updated to 1001. In this example, the network function 23 also stores new text message exchanges between the user and the same contact in the respective mailbox (step 104). MODSEQ is updated as those text message exchanges are stored to, in this example, a value of 1012.

When the client 22 desires to update the VVMMWIs at the client device 20 or when the client 22 is interested in only retrieving VVM objects, using conventional IMAP syntax, the client 22 sends a LIST request to the CMS server 16 with the CHANGEDSINCE option of 1000 as a request for a list of mailboxes with MODSEQ values that are greater than 1000 (step 106). The CMS server 16 processes the LIST request to identify all mailboxes of the user that have MODSEQ values that are greater than 1000 (step 108). The CMS server 16 then returns the identified list of mailboxes to the client 22 (step 110). At this point, the client 22, or more generally the client device 20, cannot know which of the returned mailboxes, if any, include VVM objects that have been stored since the last synchronization. Thus, for each of the returned mailboxes, the client 22 must select the mailbox, fetch new objects, etc. (step 112) and processes the objects for all of the returned mailboxes to identify any new VVM messages (step 114). At that point, the client 22 can update the VVMMWIs to indicate the contacts for which the user has VVM messages waiting. Repeating this process frequently requires a significant amount of signaling and, as such, a more efficient procedure is desired.

Figure 3A:
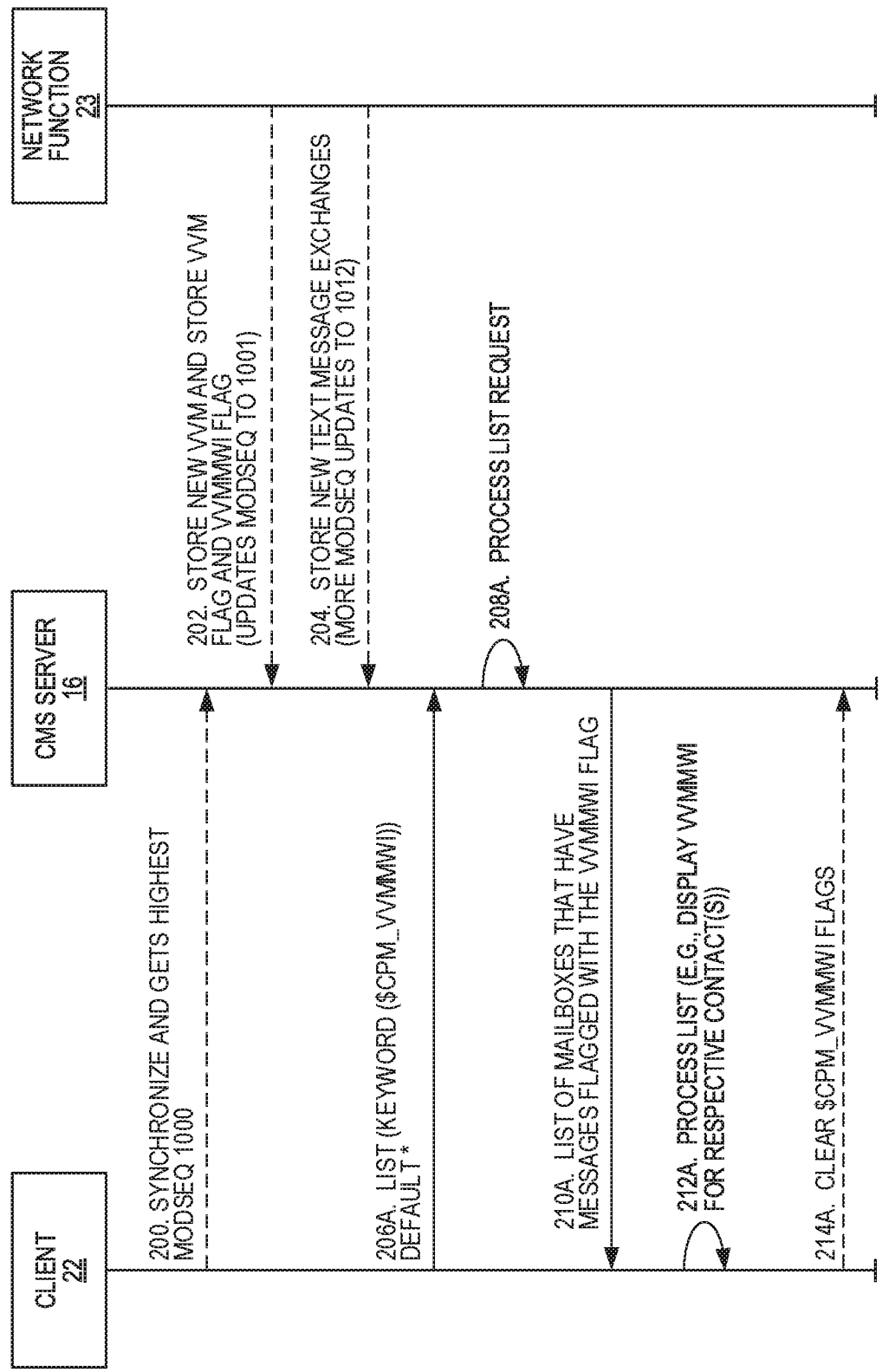
FIG. 3A illustrates the operation of a client to efficiently obtain, from a Common Message Store (CMS) server, a list of mailboxes of a user that contain objects flagged with one or more specified keyword flags of interest according to some embodiments of the present disclosure.

In this regard, embodiments are disclosed herein that enable the client device 20, and in particular the client 22, to efficiently and quickly obtain information regarding only those mailboxes containing objects of interest. Specifically, FIG. 3A illustrates the operation of the system 10 of FIG. 1 to enable the client 22 of one of the client devices 20 to efficiently obtain a list of all mailboxes of the user that contain, in these examples, new VVM messages for the user according to some embodiments of the present disclosure. Note that while much of the discussion herein focuses on VVM messages as an example, the concepts disclosed herein are not limited to VVM messages; instead, the concepts disclosed herein can be used for any type(s) of objects.

As illustrated, optionally, the client 22 initially synchronizes local copies of the mailboxes of the user with those stored in the message store 18 (step 200). The client 22 may also get the highest MODSEQ value among all of the mailboxes of the user, where for this example the highest MODSEQ is 1000. Sometime thereafter, the network function 23 stores a new VVM message from a contact of the user into the respective mailbox along with a VVM flag and a VVMMWI flag (step 202). MODSEQ is updated to 1001. The VVM flag identifies the VVM message as a VVM message, and the VVMMWI flag identifies the VVM message as a new VVM message (i.e., a waiting VVM message that has not yet been seen by the user). In this example, the network function 23 also stores new text message exchanges between the user and the same contact in the respective mailbox (step 204). MODSEQ is updated as those text message exchanges are stored to, in this example, a value of 1012. Note that steps 200-204 are optional. All that is needed is the message store 18 storing multiple mailboxes for the user, where some objects in at least some of the mailboxes of the user are flagged with a keyword(s) (e.g., the VVM flag and/or VVMMWI flag).

When the client 22 desires to update the VVMMWIs at the client device 20, the client 22 sends a LIST request including a KEYWORD selection option that specifies the VVMMWI flag ($CPM_VVMMWI) (step 206A). As discussed below, the KEYWORD selection option is a new selection option for the LIST request (i.e., the KEYWORD selection option is not currently available in IMAP). Note that while this new selection option is referred to herein as the "KEYWORD" selection option, it should not be limited to "KEYWORD." Rather, this selection option is a selection option that enables the client 22 to send, to the CMS server 16, a single request for a list of mailboxes of the user that include one or more objects that are flagged with any of the one or more specified flags. In this example, only the VVMMWI flag is specified such that the LIST request for a list of mailboxes of the user that include one or more objects that are flagged with the VVMMWI flag. In the LIST request of step 206A, "Default*" specifies that the LIST request is asking for all mailboxes located below Default, which in this example is the root folder in which all of the mailboxes of the user are located (i.e., the LIST request here will return all mailboxes accessible by the user that include one or more objects flagged with the specified keyword flag.

The CMS server 16 processes the LIST request to identify all of the mailboxes of the user that include one or more objects flagged with the VVMMWI flag ($CPM_VVM-MWI) (step 208A). The CMS server 16 then returns a list of the identified mailboxes to the client 22 (step 210A). The client 22, or more generally the client device 20, then processes the returned list of mailboxes to, e.g., display a VVMMWI for each of the respective contacts of the user (step 212A). This processing may also include, for example, fetching the messages flagged with the VVMMWI flag ($CPM_VVMMWI) from the identified mailboxes. Optionally, after processing the list of identified mailboxes, the client 22 clears the VVMMWI flags ($CPM_VVMMWI) of the respective messages in the identified mailboxes (step 214A). The VVMMWI flag may be cleared using an appropriate IMAP STORE command (e.g., "UID STORE [uid]

FLAGS (\Seen $CPM_VVM)" where, by excluding the $CPM_VVMMWI flag from the UID STORE command, the $CPM_VVMMWI flag is cleared). In other words, the existing flags of the message having the specified UID are overwritten with the specified flags. Since the specified flags do not include $CPM_VVMMWI, by implication, $CPM_VVMMWI was cleared. Note that the UID is a unique identifier that permanently refers to a specific message within the mailbox.

Using the process of FIG. 3A, the client device 20 is enabled to obtain the list of mailboxes that include objects of interest (new VVM messages in this example) using a single LIST request. This single LIST request enables this information to be obtained much more efficiently than when using conventional IMAP procedures, which require a LIST request to identify mailboxes containing new objects in general and then fetching and processing the new objects in each of the identified mailboxes to identify new VVM messages as described with respect to FIG. 2 above.

Figure 3B:
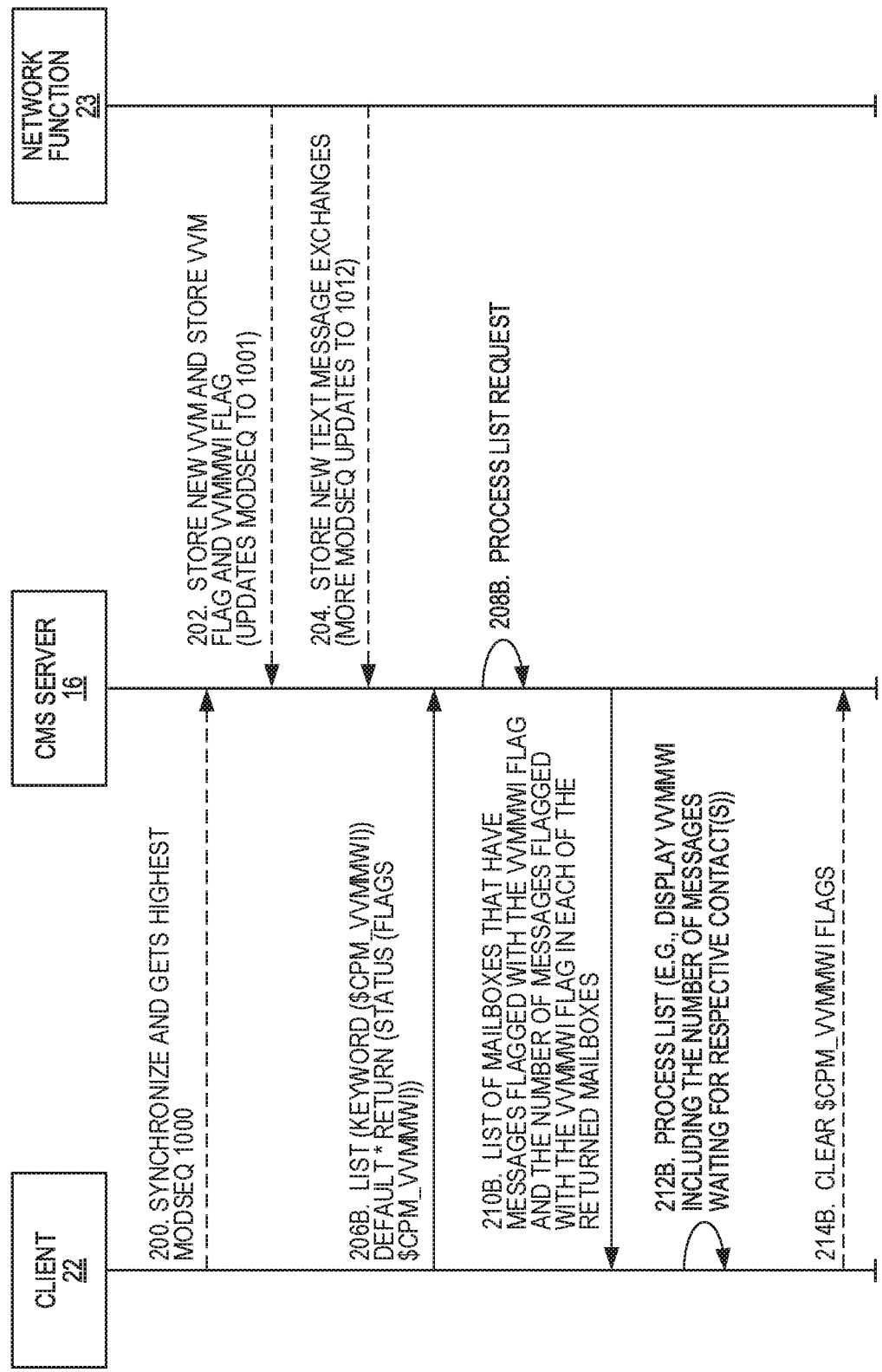
FIG. 3B illustrates the operation of a client to efficiently obtain, from a CMS server, a list of mailboxes of a user that contain objects flagged with one or more first keyword flags of interest and, for each of those mailboxes, the number of objects in the mailbox that are flagged with each of one or more second keyword flags of interest, where the first and second keyword flag(s) of interest may or may not be the same, according to some embodiments of the present disclosure.

FIG. 3B illustrates an embodiment that is similar to that of FIG. 3A but where the single LIST request also returns the number of objects flagged with each of one or more specified keyword(s) in each of the returned mailboxes of the user according to some other embodiments of the present disclosure. Again, note that while much of the discussion herein focuses on VVM messages as an example, the concepts disclosed herein are not limited to VVM messages; instead, the concepts disclosed herein can be used for any type(s) of objects.

As illustrated, optionally, the client 22 initially synchronizes local copies of the mailboxes of the user with those stored in the message store 18 (step 200). The client 22 may also get the highest MODSEQ value among all of the mailboxes of the user, where for this example the highest MODSEQ is 1000. Sometime thereafter, the network function 23 stores a new VVM message from a contact of the user into the respective mailbox along with a VVM flag and a VVMMWI flag (step 202). MODSEQ is updated to 1001. The VVM flag identifies the VVM message as a VVM message, and the VVMMWI flag identifies the VVM message as a new VVM message (i.e., a waiting VVM message that has not yet been seen by the user). In this example, the network function 23 also stores new text message exchanges between the user and the same contact in the respective mailbox (step 204). MODSEQ is updated as those text message exchanges are stored to, in this example, a value of 1012. Note that steps 200-204 are optional. All that is needed is the message store 18 storing multiple mailboxes for the user, where some objects in at least some of the mailboxes of the user are flagged with a keyword(s) (e.g., the VVM flag and/or the VVMMWI flag).

When the client 22 desires to update the VVMMWIs at the client device 20, the client 22 sends a LIST request including a KEYWORD selection option that specifies the VVMMWI flag ($CPM_VVMMWI) as well as a STATUS return option including a FLAGS status item (step 206B). As discussed below, the KEYWORD selection option is a new selection option for the LIST request (i.e., the KEYWORD selection option is not currently available in IMAP). Note that while this new selection option is referred to herein as the "KEYWORD" selection option, it should not be limited to "KEYWORD." Rather, this selection option is a selection option that enables the client 22 to send, to the CMS server 16, a single request for a list of mailboxes of the user that include one or more objects that are flagged with one or more specified flags which, in this example, is the VVMMWI flag. The FLAGS status item for the STATUS return option is also a new status item for the STATUS return option. The FLAGS status item indicates that the status returned for each mailbox in response to the LIST request is to include the number of objects in that mailbox that are flagged with one or more flag(s) specified by the FLAGS status item, which in this example is the VVMMWI flag ($CPM_VVMMWI). Note that the set of keywords specified in the FLAGS return option may or may not be the same as the set of keywords specified in the KEYWORD selection option. For example, the KEYWORD selection option may specify a set of keywords including keywords A, B, and C, but the FLAGS return option may specify the same set of keywords A, B, and C or some different set of keywords such as, e.g., a set of keywords including keyword A or a set of keywords including keywords A, B, C, and D or a set of keywords including keywords D and E.

The CMS server 16 processes the LIST request to identify all of the mailboxes of the user that include one or more objects flagged with the VVMMWI flag ($CPM_VVMMWI) and, for each identified mailbox, the number of objects in that mailbox that are flagged with the VVMMWI flag ($CPM_VVMMWI) (step 208B). The CMS server 16 then returns a list of the identified mailboxes to the client 22 including the requested FLAGS status item (step 210B). Thus, in other words, the returned list of mailboxes includes, for each returned mailbox, the number of objects in that mailbox that are flagged with the VVMMWI flag. The client 22, or more generally the client device 20, then processes the returned list of mailboxes to, e.g., display a VVMMWI for each of the respective contacts of the user (step 212B). In this example, for each returned mailbox, the mailbox corresponds to a respective contact of the user. Thus, for each returned mailbox, the VVMMWI indicates: (a) the respective contact and (b) the number of objects in the mailbox of the user for that contact that are flagged with the VVMMWI flag. In this manner, the VVMMWI indicates not only the contact for which there is a new VVM message but also the number of new VVM messages from that contact.

The processing of step 212B may also include, for example, fetching the messages flagged with the VVMMWI flag ($CPM_VVMMWI) from the identified mailboxes. Optionally, after processing the list of identified mailboxes, the client 22 clears the VVMMWI flags ($CPM_VVMMWI) of the respective messages in the identified mailboxes (step 214B). The VVMMWI flag may be cleared using an appropriate IMAP STORE command (e.g., "UID STORE [uid] FLAGS (\Seen $CPM_VVM)" where, by excluding the $CPM_VVMMWI flag from the STORE command, the $CPM_VVMMWI flag is cleared).

Using the process of FIG. 3B, the client device 20 is enabled to obtain the list of mailboxes that include objects of interest (new VVM messages in this example) and, for each returned mailbox, the number of objects for each specified interest/flag using a single LIST request. This single LIST request enables this information to be obtained much more efficiently than when using conventional IMAP procedures, which require a LIST request to identify mailboxes containing new objects in general and then fetching and processing the new objects in each of the identified mailboxes to identify new VVM messages as described with respect to FIG. 2 above.

The embodiments of FIGS. 3A and 3B utilize keyword flags (e.g., a VVMMWI flag) as well as an IMAP extension (i.e., a KEYWORD selection option for the LIST command and, in some embodiments, a FLAGS status item for the STATUS return option) to provide an efficient mechanism by which the client 22 can obtain a list of mailboxes including objects flagged with a keyword(s) of interest and, in some embodiments, the number of objects in each mailbox that are flagged with each keyword of interest. A more detailed discussion of the use of keywords as well as the IMAP extension is now provided.

Importantly, while FIG. 3A illustrates a process that utilizes keyword flags in the KEYWORD selection option for the LIST command and FIG. 3B illustrates a process that utilizes keyword flags in both the KEYWORD selection option for the LIST command and the FLAGS status item for the STATUS return option for the LIST command, the concepts disclosed herein are not limited to being used with the LIST command. Further, the FLAGS status item is not limited to being used as a status item for the STATUS return option for the LIST command. For example, the FLAGS status item may be utilized for a STATUS command for a specific mailbox (i.e., a STATUS command that includes the FLAGS status item will return the number of objects in the specified mailbox that are flagged with each of the keyword flag(s) specified in the FLAGS status item of the STATUS command). As another example, the FLAGS status item may be utilized for a STATUS return option for a LIST command that does not also utilize the KEYWORD selection option.

Flags

As discussed above, specialized objects, or items, or items that are otherwise of interest are identified, according to embodiments of the present disclosure, by setting a flag on those objects within the respective mailbox. In other words, a new flag is defined for each of one or more object types. Rather than pre-defining the flag names in the IMAP extension, in some embodiments, an extensible approach is used whereby new flags can be defined (e.g., by the appropriate standardization bodies), but the IMAP server (e.g., the CMS server 16) support need not change as new flags are introduced. It should be noted that, at least with respect to IMAP, flags are not typically used for permanent attributes of an object. The flags offer the ability to modify the attributes of an object, where a message is immutable. Although "type" is perhaps immutable, storing a flag with this meaning makes it possible for inconsistency between the object and the "type" indicated. However, the benefits of using flags in terms of efficient search, and extensibility as proposed, are seen to outweigh this concern. Note also that the specific example below of MWI is a case where the flag is not being used synonymously to object type.

No specific IMAP extension capability is required to define this aspect of the present disclosure. In some embodiments, an IMAP server (e.g., the CMS server 16) will be required (e.g. by OMA CPM) to support client-created keywords, as defined in Section 7.1 of M. Crispin, "Internet Message Access Protocol—Version 4rev1," Network Working Group Request for Comments 3501, March 2003 (hereinafter "RFC 3501"): "The PERMANENTFLAGS list can also include the special flag \*, which indicates that it is possible to create new keywords by attempting to store those flags in the mailbox." The CMS server 16 will thus support allowing the client 22 to store flags against the messages in a mailbox, and the definition and meaning of those flags to the clients 22 can be defined by the standards body without modifying the server implementation.

For the purpose of the examples provided herein, the new flags used to flag specific objects will be named $CPM_xxx, where xxx represents the type of object or other significant indication about the object. For example (an example used through the rest of this disclosure), if an object is to be flagged as being a VVM message, a flag named $CPM_VVM is stored for that object. Then, e.g., in later FETCH or SEARCH operations, the objects (e.g., messages) with this flag will be identifiable. An IMAP example interaction using the $CPM_VVM flag would look something like:

C: f2 APPEND Default/+17783737245 (\Seen $CPM_VVM) {32113}
S: + Ready for literal data
C: < . . . sends the VVM message object to the server>
S: f2 OK [APPENDUID 3857529045 4392] APPEND Completed
C: f3 UID FETCH 4392 (FLAGS)
S: *FETCH (UID 4392 FLAGS (\Seen $CPM_VVM))
S: f3 OK FETCH Completed The VVM flag can be set on any object, but the intent is that it would be set on only VVM messages. Further, the VVM flag may, in some embodiments, be set by any entity. However, in some preferred embodiments, the VVM flag is set by the storing network function 23 (e.g., a PF or VVM server) when the message is created and stored in the message store 18, and the VVM flag is set only for VVM messages. Similar flags may be created and used for other types of objects or to specify characteristics of other objects.

The VVM flag in and of itself would allow a client, such as the client 22, to do a "SEARCH KEYWORD $CPM_VVM" IMAP command for a specific mailbox and get a resulting set of messages in that mailbox that have the VVM flag set. The client 22 can combine multiple conditions in the SEARCH command in order to find VVM objects which, e.g., have changed since the last known MODSEQ value and, e.g., do not have \Seen or \Deleted flags to obtain concise information about VVM messages of interest to the client 22.

Besides the generic mechanism described above, for the purposes of VVM applications, two separate flags/keywords may be used, namely, a VVM flag ($CPM_VVM) that indicates that an object is a VVM message and a VVMMWI flag ($CPM_VVMMWI) that indicates that an object is an unread, or new, VVM. Although this information could be concluded by examining the $CPM_VVM and \Seen flags, the discussion below will show how this can be used efficiently. In particular, the discussion below describes how these separate flags can be used to efficiently enable a VVM client (e.g., one of the clients 22) to access critical information in a minimal set of operations.

With the above definitions, in some embodiments, both the $CPM_VVMMWI flag and the $CPM_VVM flag are set for new VVM messages stored in the message store 18 during creation of the VVM messages. In the lifecycle of a VVM message, the new VVM message is stored with two flags: $CPM_VVM and $CPM_VVMMWI. When the VVM message is played on a client device 20, the $CPM_VVMMWI flag is cleared, and, if VVM is using the \Seen flag, the client device 20 can also set the \Seen flag (e.g., both changes can be done via an IMAP STORE command with "STORE id FLAGS (\Seen VVM)" which will leave the VVM flag in place and add \Seen, while removing the VVMMWI flag. Note that the MWI concept expressed here could be applied to other similar "message waiting" services, using specific keywords for each service.

STATUS Impact

The use of the VVM flag and the VVMMWI flag with respect to the SEARCH command is useful, but, when using the SEARCH command, the client 22 must select a particular mailbox in order to find the information about which messages in that mailbox have the VVM and/or VVMMWI flags. Thus, for example, if twenty (20) mailboxes have changed since the last synchronization, then the client 22 would need to examine each of those twenty (20) mailboxes to determine which of those mailboxes include new VVM messages. For most users, the number of VVM messages is likely to be small and, as such, processing each mailbox is wasteful.

Ideally, the client 22 would like to know which mailboxes have VVM changes, and only select those mailboxes for further examination. In order to make the VVM information more readily accessible without opening each mailbox, the IMAP STATUS command can be extended and utilized as follows. The STATUS command provides a limited set of information about a mailbox, but the command is available without selecting the mailbox and is in fact usable within the LIST-STATUS command (as a STATUS return option) to get such information for every mailbox returned by the LIST command. The LIST command is also referred to herein as the LIST request.

The STATUS command is not easily extended by a server. RFC 3501 defines five (5) status items for the STATUS command, namely, MESSAGES, RECENT, UIDNEXT, UIDVALIDITY and UNSEEN. The CONDSTORE extension to the STATUS command adds MODSEQ to this set of status items. A. Melnikov, "Collected Extensions to IMAP4 ABNF," Network Working Group Request for Comments 4466, April 2006 (hereinafter "RFC 4466") defines Augmented Backus-Naur Form (ABNF) updates which support extending the STATUS items. ABNF is essentially a mathematical expression of the valid syntax of the protocol. ABNF is defined in RFC3501. This new ability would need to be defined formally as an IMAP extension, which is referred to herein as LIST-KEYWORD for the purposes of this disclosure. A server which supports extra STATUS information would need to declare this in the server's CAPABILITY response, such as:

C: c1 CAPABILITY
S: *CAPABILITY IMAP4v1 LIST-STATUS UIDPLUS CONDSTORE QRESYNC XLIST-CHANGEDSINCE XLIST-KEYWORD
S: c1 OK CAPABILITY Completed Unless this new IMAP extension is standardized by the Internet Engineering Task Force (IETF), the CAPABILITY name for the extension should start with the letter X, per RFC 3501 requirements. As such, the capability string for this proposed extension would be XLIST-KEYWORD.

Embodiments of the present disclosure add another STATUS item, which is referred to herein as the FLAGS status item. When the FLAGS status item is used by a client 22 in a STATUS command, the FLAGS status item is followed by one or more flags, or keywords. The intent is to identify which flag(s) is to be used in generating the STATUS output. For each flag, the value returned with a FLAGS status item will be the count of the number of objects in the mailbox possessing that flag. Note that the naming of the new status item as "FLAGS" is not important. Any name can be used, but the point is that this new status item enables the return of the number of objects in the mailbox that are flagged with one or more specified flags.

As an example, assume that a mailbox contains 100 objects, of which 5 have the $CPM_VVM flag set and 2 have the $CPM_VVMMWI set. A client 22 could have the following exchange with the CMS server 16:

C: r6 STATUS Default/+17783737245 (MESSAGES UIDNEXT FLAGS ($CPM_VVM $CPM_VVM-MWI))
S: *STATUS Default/+17783737245 (MESSAGES 100 UIDNEXT 104 $CPM_VVM 5 $CPM_VVMMWI 2)
S: r6 OK STATUS Completed Thus, in response to the STATUS command from the client 22 that includes the FLAGS status item followed by the keywords, or flags, $CPM_VVM and $CPM_VVM-MWI, the CMS server 16 returns status information for the mailbox that includes the number of objects in the mailbox that are flagged with the $CPM_VVM flag (which is 5 in this example) and the number of objects in the mailbox that are flagged with the $CPM_VVMMWI flag (which is 2 in this example).

In some embodiments, the STATUS item representing the number of objects matching a specific keyword excludes any objects which also have the \Deleted flag set. In other embodiments, the STATUS item representing the number of objects matching a specific keyword does not exclude any objects which also have the \Deleted flag set.

In some alternative embodiments, the FLAGS status item returns the number of objects in a mailbox that have the specified keyword flag and no \Seen flag and no \Deleted flag.

Using LIST Command to Maximum Benefit

With the current IMAP access as specified by GSMA RCS, a client 22 can use LIST-STATUS with the MODSEQ argument to the STATUS parameter, and get a list of all mailboxes and their associated MODSEQ values. While not essential for concepts disclosed herein, the LIST-CHANGEDSINCE extension defined by U.S. patent application Publication No. 2016/0269335, entitled METHOD AND APPARATUS FOR IDENTIFYING CHANGED MAILBOXES IN AN INTERNET MESSAGE ACCESS PROTOCOL (IMAP) LIST, which was filed Mar. 13, 2015 lets the LIST response be limited to only mailboxes which have changed since a reference MODSEQ value, provided by the client 22 in the LIST command. This capability can be used by the client 22, for instance, to limit the set of mailboxes to only those which changed since the last time the client 22 synchronized with the CMS. However, if 100 mailboxes have changed, the client 22 cannot know which mailboxes might contain changes of interest to the client 22 (e.g., new VVM messages, or VVMs which have subsequently been marked as no longer new—presumably the \Seen flag will be used for this indication).

With the above changes, a synchronization by the client 22 can be optimized using the LIST-STATUS form of the LIST command, along with the CHANGEDSINCE form, such as:

C: c1 CAPABILITY
S: *CAPABILITY IMAP4v1 LIST-STATUS UIDPLUS CONDSTORE QRESYNC XLIST-CHANGEDSINCE XLIST-KEYWORD
S: c1 OK CAPABILITY Completed
C: c2 LIST (CHANGEDSINCE 442000) Default*RETURN (STATUS (FLAGS ($CPM_VVM-MWI)))
S: *LIST ( ) Default/+19198675309
S: *STATUS Default/+19198675309 ($CPM_V-VMMW10)
S: *LIST ( ) Default/+17783737245
S: *STATUS Default/+17783737245 ($CPM_V-VMMW11)
S: *LIST 0 Default/+15145551212
S: *STATUS Default/+15145551212 ($CPM_VVMMWI 0)
S: c2 OK LIST Completed The above finds that although there have been perhaps hundreds of changes in the Default mailboxes since the client's last sync, there is only one mailbox with an unseen voicemail. The client 22 has to look at the $CPM_VVM-MWI value returned for every mailbox with changes since the referenced MODSEQ value, but can quickly filter out the ones not of interest. The client 22 can then select that one mailbox and quickly find what's new, as described earlier, i.e.:

C: c3 SELECT Default/+17783737245
S: *172 EXISTS
S: *1 RECENT
S: *OK [UNSEEN 12] Message 12 is first unseen
S: *OK [UIDVALIDITY 3857529045] UIDs valid
S: *OK [UIDNEXT 4401] Predicted next UID
S: *OK [HIGHESTMODSEQ 442751] Highest modsequence value in this mailbox
S: *FLAGS (\Answered \Flagged \Deleted \Seen \Draft Archived \*)
S: *OK [PERMANENTFLAGS (\Deleted \Seen Archived \*)]
S: c3 OK [READ-WRITE] SELECT completed
C: c4 UID SEARCH CHANGEDSINCE 44200 KEYWORD $CPM_VVM
S: *SEARCH 4391
S: OK UID SEARCH Completed
C: c5 UID FETCH 4391 (MODSEQ FLAGS BODY[ ])
S: *13 FETCH (UID 4391 MODSEQ 442743 FLAGS ($CPM_VVM $CPM_VVMMWI) {32113}
   <server spews content of the message>)
S: c5 OK FETCH Completed
C: c6 LOGOUT
S: *BYE Client logged out
S: c6 LOGOUT Completed In the example above, the client 22 selects mailbox Default/+17783737245 and receives information from the CMS server 16 regarding the selected mailbox. The client 22 then searches for the Unique Identifier (UID) of any message(s) that have a MODSEQ value higher than 44200 and are flagged with the $CPM_VVM flag. Thus, in this example, the client 22 is finding all VVM messages in the mailbox that were added since the last synchronization rather than finding only those VVM messages with the $CPM_VVMMWI flag set.

Extending the LIST Command Syntax

Using the FLAGS status item and the LIST command, the client 22 is able to: (1) obtain a list of all mailboxes (possibly only those that have a MODSEQ value higher than a specified CHANGEDSINCE value) and (2) obtain the number of objects in each of those mailboxes that are flagged with a specified flag(s). However, note that if there are 100 total mailboxes but only one of those mailboxes includes an object flagged with the VVMMWI flag, the client 22 must still process the returned list to identify that one mailbox that has the object(s) that are flagged with the VVMMWI flag. In other words, using the syntax for the LIST command described above, the client 22 may be returned a list of mailboxes that include many mailboxes that are not of interest.

Embodiments of the present disclosure provide an extension to the IMAP LIST command syntax that enables the client 22 to obtain a list of mailboxes that includes only mailboxes of interest (in this example, a list of mailboxes that includes only those mailboxes that contain objects that are flagged with the VVMMWI flag).

More specifically, the LIST-EXTENDED IMAP extension (B. Leiba et al., "Internet Message Access Protocol version 4—LIST Command Extensions," Network Working Group Request for Comments 5258, June 2008 (hereinafter "RFC 5258")) defines the syntax with which a client 22 may constrain the results of the LIST command by specifying Selection options. RFC5258 defines a few Selection options (SUBSCRIBED, REMOTE, and RECURSIVEMATCH), none of which is appropriate to our needs in finding mailboxes with changes.

Another Selection option can be introduced that would reduce the set of returned mailboxes to only those of interest. Essentially, this Selection option is similar to LIST-CHANGEDSINCE, but would use the KEYWORD argument instead of the MODSEQ value. This would modify the LIST command syntax specifically extending the Selection option syntax as follows:

list-select-independent-opt=1 "KEYWORD" SP flag-list

Note that "flag-list" is defined in RFC3501 as:

$$\text{flag-list} = ''(''[\text{flag} * (SP\ \text{flag})]'')''$$

$$\text{flag} = ''\backslash\text{Answered}''\ /\ ''\backslash\text{Flagged}''\ /\ ''\backslash\text{Deleted}''\ /$$

$$''\backslash\text{Seen}''\ /\ ''\backslash\text{Draft}''\ /\ \text{flag-keyword}/\text{flag-extension};$$

$$\text{Does not include}\ ''\backslash\text{Recent}''$$

The "flag-keyword" part of the above syntax is where the new $CPM_xxx keywords would fall into the existing syntax definition.

With this extension to the LIST command Selection options, the above LIST example would be simplified to the following, where even the STATUS part is no longer needed to find out which mailboxes contain unread VVM messages:

C: c2 LIST (KEYWORD ($CPM_VVMMWI)) Default*
S: *LIST ( )"I" Default/+17783737245
S: c2 OK LIST Completed Thus, using the LIST command, or LIST request, with the KEYWORD selection option, the client 22 can request a list of mailboxes containing one or more objects that are flagged with the specified flag, or keyword, which in this example is the VVMMWI flag ($CPM_VVMMWI). In this particular example, the returned list includes only one mailbox (Default/+17783737245).

Although the above is most brief, the typical MWI interest is to immediately identify how many messages are outstanding from each contact. Thus, in some embodiments, the client 22 utilizes a LIST command, or LIST request, with both the KEYWORD selection option and the FLAGS STATUS item. As an example, the following exchange may be utilized to obtain a list of mailboxes that contain one or more objects that are flagged with the VVMMWI flag ($CPM_VVMMWI) and, for each returned mailbox, the number of objects in that mailbox that are flagged with the VVMMWI flag ($CPM_VVMMWI):

C: c2 LIST (KEYWORD ($CPM_VVMMWI)) Default*RETURN (STATUS (FLAGS ($CPM_VVMMWI)))
S: *LIST 0 "I" Default/+17783737245
S: *STATUS Default/+17783737245 ($CPM_VVMMWI 2)
S: c2 OK LIST Completed In this example, the returned list includes one mailbox (Default/+17783737245) and the number of objects in that mailbox that are flagged with the VVMMWI flag ($CPM_VVMMWI), which is 2. In this context, the LIST command, or LIST request, includes: (1) the KEYWORD selection option (i.e., "LIST (KEYWORD($CPM_VVMMWI)")") and (2) a STATUS return option specifying the FLAGS status item (i.e., "RETURN (STATUS (FLAGS ($CPM_VVM-MWI)))").

Note that the above can also be combined with the LIST-CHANGEDSINCE capability to constrain the returned mailboxes to only those with changes since a specific MODSEQ value, but this should not be necessary if the client 22 is specifically interested only in MWI.

The above changes (Keyword flags, new KEYWORD argument on the LIST command, and the new FLAGS argument on the STATUS command) will let a client 22 perform a very quick and efficient synchronization of only the VVM related content in the CMS. The concepts disclosed herein also apply to other specialty uses of the CMS as well.

Any existing notification mechanism would include the new flag, and possibly the new STATUS information in cases such as IMAP NOTIFY. A subscription based notification mechanism published via a web service could potentially limit the subscription to only mailbox and/or message objects or changes related to objects with the specified keyword flag.

Figure 4:
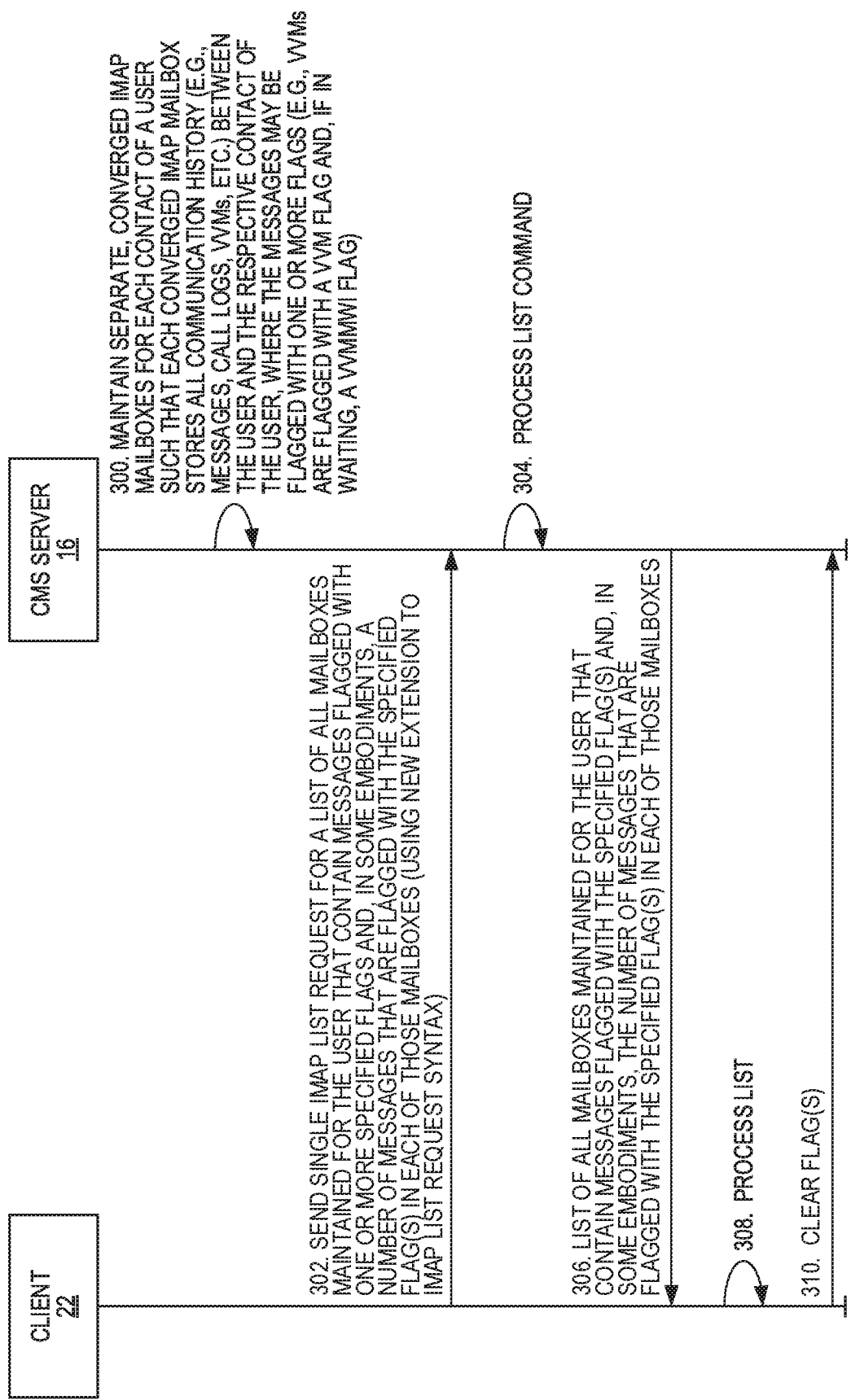
FIG. 4 illustrates the operation of a client and a CMS server according to some embodiments of the present disclosure.

While the example embodiments above focus on VVM, the present disclosure is not limited thereto. In this regard, FIG. 4 illustrates the operation of one of the clients 22 and the CMS server 16 according to some embodiments of the present disclosure. As illustrated, the CMS server 16 maintains separate, converged IMAP mailboxes for each of the contacts of the user, as described above (step 300). At some point, the client 22 sends a single LIST request including a KEYWORD selection option that specifies one or more flags (which are also referred to herein as "keywords" or "keyword flags") of interest as well as a STATUS return option including a FLAGS status item that specifies, in this example, the same one or more flags (step 302). Note that the one or more keywords specified by the FLAGS status item may be the same or different, as a set, as the one or more keywords specified by the KEYWORD selection option. In other words, the set of keywords specified by the FLAGS status item may be the same as or different than the set of keywords specified by the KEYWORD selection option.

The CMS server 16 processes the LIST request to identify all of the mailboxes of the user that include one or more objects flagged with any of the one or more flags specified by the KEYWORD selection option of the LIST request and, for each identified mailbox, the number of objects in that mailbox that are flagged with each of the one or more keywords specified in the FLAGS status item of the STATUS return option of the LIST request (step 304). The CMS server 16 then returns a list of the identified mailboxes to the client 22 including the requested FLAGS status item(s) (step 306). Thus, in other words, the returned list of mailboxes includes, for each returned mailbox, the number of objects in that mailbox that are flagged with each of the flag(s) specified in the FLAGS status item of the STATUS return option of the LIST request sent in step 302. The client 22, or more generally the client device 20, then processes the returned list of mailboxes to perform some desired action(s) (e.g., fetch objects flagged with the specified keyword(s) from the returned mailboxes, etc.) (step 308). Optionally, in some embodiments, the client 22 clears one or more of the flags for the respective objects in the identified mailboxes (step 310).

Note that the example of FIG. 4 uses both the FLAGS status item and the KEYWORD selection option; however, the present disclosure is not limited thereto. In some embodiments, the LIST request in step 302 may include the KEYWORD selection option for the LIST request but not the FLAGS status item or may include the FLAGS status item but not the KEYWORD selection option.

Figure 5:
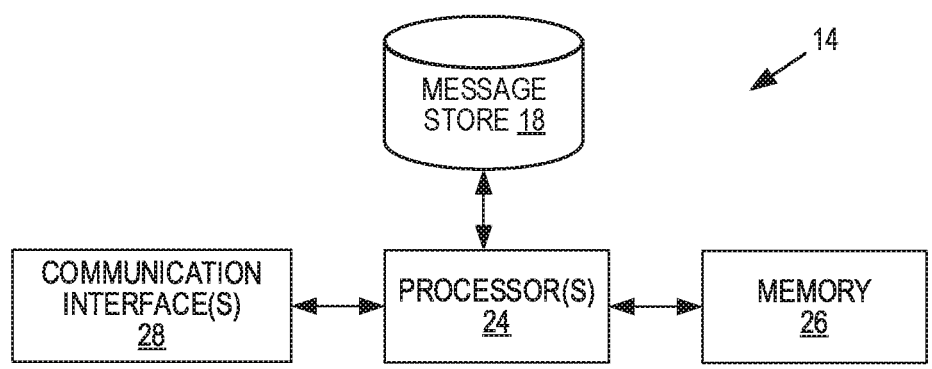
FIGS. 5 and 6 are example block diagrams of the server system of FIG. 1 according to some embodiments of the present disclosure.

FIG. 5 is a block diagram of the server system 14 according to some embodiments of the present disclosure. As illustrated, the server system 14 includes one or more processors 24 (e.g., one or more Central Processing Units (CPUs), one or more Application Specific Integrated Circuits (ASICs), one or more Field Programmable Gate Arrays (FPGAs), or the like, or any combination thereof), memory 26, and a communication interface(s) 28 (e.g., a network interface). The server system 14 also includes a message store 18, which may be implemented in any suitable data storage device or system. In some embodiments, the CMS server 16 is implemented in software that is stored in the memory 26 and executed by the processor(s) 24.

In some embodiments, a computer program including instructions which, when executed by at least one processor, causes the at least one processor to carry out the functionality of the CMS server 16 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 6:
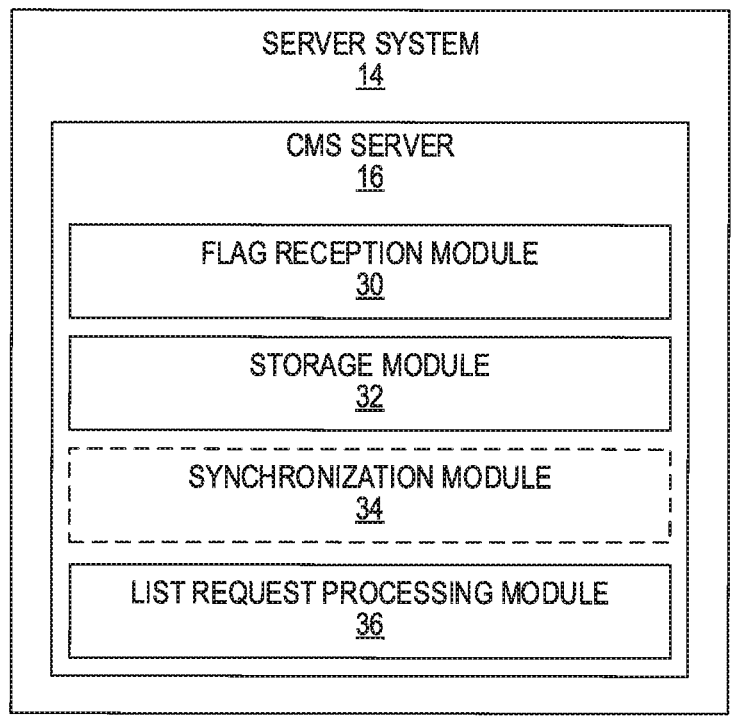

FIG. 6 is a block diagram of the server system 14 according to some other embodiments of the present disclosure. As illustrated, the server system 14 includes the CMS server 16, which includes a flag reception module 30, a storage module 32, a synchronization module 34, and a LIST request processing module 36, each of which is implemented in software. The flag reception module 30 operates, e.g., in conjunction with the storage module 32 to receive (via the communication interface(s) of the server system 14, which are not shown) and store flags in association with objects when stored in the message store 18, as described above. The synchronization module 34 operates to perform synchronization procedures whereby copies of mailboxes of a user stored in the client devices 20 are synchronized with the mailboxes of the user stored in the message store 18. The LIST request processing module 36 operates to receive LIST requests from the clients 22 (or more generally the client devices 20) (via the communication interface(s) of the server system 14, which are not shown), process the LIST requests, and return the corresponding results to the clients 22 (via the communication interface(s) of the server system 14, which are not shown), as described above.

Figure 7:
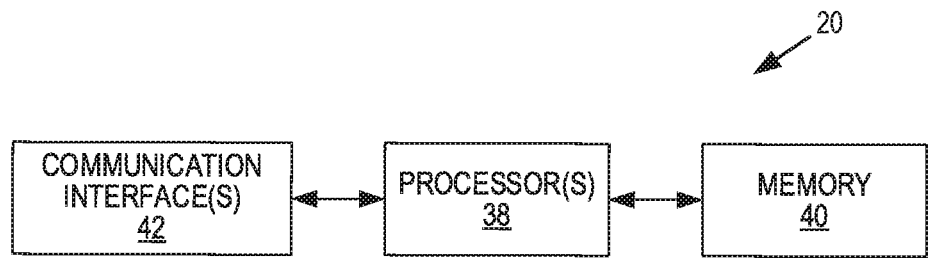
FIGS. 7 and 8 are example block diagrams of one of the client devices of FIG. 1 according to some embodiments of the present disclosure.

FIG. 7 is a block diagram of the client device 20 according to some embodiments of the present disclosure. As illustrated, the client device 20 includes one or more processors 38 (e.g., one or more CPUs, one or more ASICs, one or more FPGAs, or the like, or any combination thereof), memory 40, and a communication interface(s) 42 (e.g., a network interface). In some embodiments, the client 22 is implemented in software that is stored in the memory 40 and executed by the processor(s) 38.

In some embodiments, a computer program including instructions which, when executed by at least one processor, causes the at least one processor to carry out the functionality of the client 22 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 8:
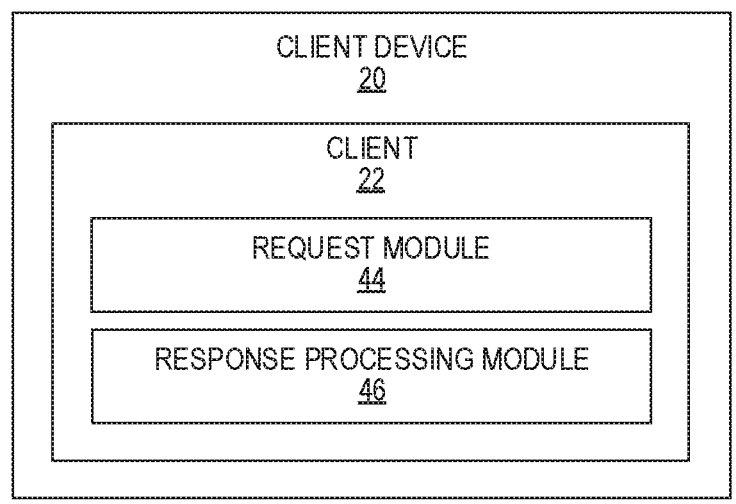

FIG. 8 is a block diagram of the client device 20 according to some other embodiments of the present disclosure. As illustrated, the client device 20 includes the client 22, which includes a request module 44 and a response processing module 46, each of which is implemented in software. The request module 44 operates to send (via an associated communication interface(s) of the client device 20, not shown) a single request (e.g., a single LIST request) for mailboxes containing objects flagged with one or more specified flags and, in some embodiments, the number of objects in each of those mailboxes that is flagged with each of the specified flags, as described above. The response processing module 46 operates to receive (via an associated communication interface(s) of the client device 20, not shown) a response to the request and process the response to perform one or more desired actions (e.g., display MWI(s)), as described above.

Systems and methods are disclosed herein that enable a client 22 to quickly and efficiently identify mailboxes that contain objects that are flagged with a specified keyword flag(s). In some embodiments, summary information that is available for the mailboxes of the users is extended (e.g., via a new STATUS item) to include information regarding the number of objects in the mailbox that are flagged with a specified keyword flag(s). Still further, embodiments are disclosed in which this new summary information is leveraged together with a new LIST command selection option to efficiently identify mailboxes that contact objects that are flagged with the specified keyword flag(s) and the number of objects in each of those mailboxes that are flagged with the specified keyword flag(s).

As described above, embodiments of the present disclosure introduce one or more flags (keyword flags) with specific defined purposes for storing different types of objects in the message store 18. The flags provide a mechanism for very fast queries on mailbox content.

In some embodiments, associated with the flag introduction, a new IMAP STATUS item (referred to herein as the FLAGS status item) is defined on a per-mailbox basis. The new STATUS item allows a value representing the number of objects flagged with the specified flag(s) to be seen from the LIST-STATUS command response, thus allowing a client 22 to quickly determine which mailboxes are of interest.

If all communication history objects are stored in the same mailbox (for any specific contact in the subscriber's contact list), then enriched communications clients can present all conversation history events in a single consolidated view simply by fetching all message objects from the conversation mailbox. This is already possible with the IMAP existing standards, though there is currently no prescription in CPM/RCS to store objects like VVM and Call Logs into the same mailbox as the text and media messaging history, as described herein.

The bigger challenge comes for a specialized client, which may be accessing the CMS for the sole purpose of finding any new objects of a specific type. The case in point here is VVM, where the client 22 wants to quickly determine if it should activate the MWIs for the respective contacts of the subscriber, and potentially fetch any new VVM objects.

As discussed above, with the current IMAP access as specified by GSMA RCS, a client 22 can use LIST-STATUS with the MODSEQ argument to the STATUS parameter, and get a list of all mailboxes and their associated MODSEQ values. While not essential for concepts disclosed herein, the LIST-CHANGEDSINCE CHANGEDSINCE extension defined by U.S. patent application Publication No. 2016/0269335, entitled METHOD AND APPARATUS FOR IDENTIFYING CHANGED MAILBOXES IN AN INTERNET MESSAGE ACCESS PROTOCOL (IMAP) LIST, which was filed Mar. 13, 2015 lets the LIST response be limited to only mailboxes which have changed since a reference MODSEQ value, provided by the client in the LIST command. This capability can be used by the client 22, for instance, to limit the set of mailboxes to only those which changed since the last time the client 22 synchronized with the CMS. However, if 100 mailboxes have changed, the client 22 cannot know which mailboxes might contain changes of interest to the client 22 (e.g., new VVM messages, or VVMs which have subsequently been marked as no longer new—presumably the \Seen flag will be used for this indication).

In some embodiments, an IMAP extension is proposed that enables the client 22 to quickly and efficiently identify mailboxes that contain objects of interest (i.e., mailboxes containing messages that are flagged with one or more specified flag(s)) and, in some embodiments, the number of objects in each of the identified mailboxes that are flagged with the specified flag(s). Again, while much of the disclosure herein focuses on VVMs, the present disclosure is not limited thereto.

While not being limited to or by any particular advantage, some example advantages provided by at least some embodiments of the present disclosure are as follows. As enriched communications become more widespread, more user interface designs will want to take advantage of combining the full communication history between two parties into a single view, with multimedia content including text and multimedia shares, location information, audio messaging, etc. In this view, VVM, for example, is something that should be integrated into the same history presentation to the user. Meanwhile, some client access to the communication history will continue to be specialized, needing only the information associated with that specific type of communication exchange.

The capability proposed herein suggests that both of these views can be satisfied by storing communication history into a single mailbox. This provides a minimum number of mailboxes to be synchronized by a client device and an easily consolidated view of all communication history from one place. Meanwhile, the specialized identification and selection capabilities introduced herein provide a highly efficient process for specialized client access to only the information of most immediate need for that specific service (such as generating a MWI when there are unread VVMs in the CMS). Although VVM is used to explain the mechanism, the embodiments described herein apply to any specialized objects.

With respect to the client device 20, the changes proposed in CPM will make VVM access possible for clients that previously had no access (e.g. on Wi-Fi, and non-Subscriber Identity Module (SIM) based devices). Many types of client devices 20 (e.g., mobile devices) are sensitive to power use due to limited batteries, and reducing the time the radio operates during synchronization provides direct benefits in battery life. Embodiments of the present disclosure reduce the exchanged information between the client device 20 and the CMS server 16 and, as such, reduce power consumption.

On the server side, embodiments of the present disclosure offer reduced Input/Output (I/O) traffic, and shorten the synchronization times. Each of these aspects increases the number of client sync sessions which can be serviced within a given time interval. Embodiments of the present disclosure use fewer mailboxes to cover all the communication history for a user and may also reduce the size of certain caches in the server, thus increasing the number of subscribers which can be supported by a server.

The following acronyms are used throughout this disclosure.
- 3GPP 3rd Generation Partnership Project
- ASIC Application Specific Integrated Circuit
- CMS Common Message Store
- CPM Converged Internet Protocol Messaging
- CPU Central Processing Unit
- FPGA Field Programmable Gate Array
- GSM Global System for Mobile Communications
- GSMA Global System for Mobile Communications Association
- IETF Internet Engineering Task Force
- IMAP Internet Message Access Protocol
- IP Internet Protocol
- I/O Input/Output
- MWI Message Waiting Indication
- OMA Open Mobile Alliance
- PF Performing Function
- RCS Rich Communication Service
- SIM Subscriber Identity Module
- SMS Short Message Service
- TLS Transport Layer Security
- UID Unique Identifier
- VVM Visual Voicemail
- VVMMWI Visual Voicemail Message Waiting Indication Those skilled in the art will recognize improvements and modifications to the embodiments of the present disclosure. All such improvements and modifications are considered within the scope of the concepts disclosed herein and the claims that follow.

What is claimed is:

1. A method of operation of a client device, the method comprising:
sending a single request to a server for a list of mailboxes, maintained by the server for a user, that contain objects flagged with any of one or more flags specified in the single request, wherein sending the single request comprises sending an Internet Message Access Protocol (IMAP) LIST request comprising a selection option that specifies the one or more flags including a visual voicemail message waiting indication flag to restrict the list of mailboxes returned in response to the IMAP LIST request to the mailboxes, maintained by the server for the user, that contain the objects flagged with any of the one or more flags;
in response to the single request, receiving from the server, the list of mailboxes, maintained by the server for the user, that contain the objects flagged with any of the one or more flags specified in the single request; and
processing the list of mailboxes.

2. The method of claim 1, further comprising clearing the visual voicemail message waiting indication flag.

3. The method of claim 1, wherein processing the list of mailboxes comprises, for each mailbox in the list of mailboxes, displaying a visual voicemail message waiting indication in association with an indication of a respective contact of the user.

4. The method of claim 1, wherein sending the single request further comprises sending the single request to the server for a number of objects in a mailbox that are flagged with each of one or more second flags specified in the single request, for each mailbox in the list of mailboxes flagged with the one or more flags specified in the single request.

5. The method of claim 4, wherein the one or more second flags are the same as the one or more flags.

6. The method of claim 4, wherein the one or more second flags are different, as a set, than the one or more flags.

7. The method of claim 4, wherein:
the one or more second flags specified in the single request comprise the visual voicemail message waiting indication flag; and
processing the list of mailboxes comprises, for each mailbox in the list of mailboxes, displaying a visual voicemail message waiting indication in association with an indication of a respective contact of the user such that the visual voicemail message waiting indication indicates a number of messages in the respective mailbox that are flagged with the visual voicemail message waiting indication flag.

8. The method of claim 4, wherein the IMAP LIST request further comprises
a STATUS return option comprising a status item that specifies the one or more second flags including the visual voicemail message waiting indication flag to thereby request that the server returns, for each mailbox in the list of mailboxes returned in response to the IMAP LIST request, the number of objects in the mailbox that are flagged with each of the one or more second flags.

9. The method of claim 1, wherein the IMAP LIST request uses a syntax that enables the IMAP LIST request to request the list of mailboxes, maintained by the server for the user, that contain the objects flagged with any of the one or more flags specified in the single request.

10. The method of claim 1, wherein sending the IMAP LIST request further comprises a STATUS return option comprising a status item that specifies one or more second flags to thereby request that the server returns, for each mailbox in the list of mailboxes returned in response to the IMAP LIST request, a number of objects in a mailbox that are flagged with each of the one or more second flags.

11. The method of claim 10, wherein the one or more second flags are the same as the one or more flags specified in the selection option.

12. The method of claim 10, wherein the one or more second flags are different, as a set, than the one or more flags specified in the selection option.

13. The method of claim 1, wherein for each mailbox, a communication history comprised in the mailbox comprises at least two of a group consisting of: a call log between the user and a respective contact of the user, text message exchanges between the user and the respective contact of the user, and visual voicemail messages from the respective contact of the user to the user.

14. A client device, comprising:
a communication interface;
one or more processors; and
memory storing instructions that are executable by the one or more processors whereby the client device is operable to:
send, via the communication interface, a single request to a server for a list of mailboxes, maintained by the server for a user, that contain objects flagged with any of one or more flags specified in the single request, wherein to send the single request, the client device is operable to send an Internet Message Access Protocol (IMAP) LIST request comprising a selection option that specifies the one or more flags including a visual voicemail message waiting indication flag to restrict the list of mailboxes returned in response to the IMAP LIST request to the mailboxes, maintained by the server for the user, that contain the objects flagged with any of the one or more flags;

in response to the single request, receive, from the server via the communication interface, the list of mailboxes, maintained by the server for the user, that contain the objects flagged with any of the one or more flags specified in the single request; and process the list of mailboxes.

15. A computer readable medium storing instructions executable by at least one processor of a client device to thereby instruct the client device to:

send a single request to a server for a list of mailboxes, maintained by the server for a user, that contain objects flagged with any of one or more flags specified in the single request, wherein to send the single request, the at least one processor instructs the client device to send an Internet Message Access Protocol (IMAP) LIST request comprising a selection option that specifies the one or more flags including a visual voicemail message waiting indication flag to restrict the list of mailboxes returned in response to the IMAP LIST request to the mailboxes, maintained by the server for the user, that contain the objects flagged with any of the one or more flags;

in response to the single request, receive, from the server, the list of mailboxes, maintained by the server for the user, that contain the objects flagged with any of the one or more flags specified in the single request; and process the list of mailboxes.

16. A method of operation of a server system, the method comprising:

receiving a single request from a client device for a list of mailboxes, maintained by the server system for a user, that contain objects flagged with any of one or more flags specified in the single request, wherein the server system maintains a plurality of mailboxes for the user;

processing the single request to determine the list of mailboxes, maintained by the server system for the user, that contain the objects flagged with any of the one or more flags specified in the single request, wherein the one or more flags specified in the single request comprise a visual voicemail message waiting indication flag, and wherein receiving the single request comprises receiving an Internet Message Access Protocol (IMAP) LIST request comprising a selection option that specifies the one or more flags including the visual voicemail message waiting indication flag to restrict the list of mailboxes returned in response to the IMAP LIST request to the list of mailboxes, maintained by the server system for the user, that contain the objects flagged with any of the one or more flags; and sending, to the client device, the list of mailboxes, maintained by the server system for the user, that contain the objects flagged with any of the one or more flags specified in the single request.

17. The method of claim 16, wherein each mailbox of the plurality of mailboxes of the user is a converged mailbox comprising a communication history for communication between the user and a respective contact of the user.

18. The method of claim 16, wherein receiving the single request comprises receiving the single request for a number of objects in a mailbox that are flagged with each of one or more second flags specified in the single request, for each mailbox in the list of mailboxes flagged with the one or more flags specified in the single request.

19. The method of claim 18, wherein:

the one or more second flags specified in the single request comprise the visual voicemail message waiting indication flag; and the IMAP LIST request further comprises a STATUS return option comprising a status item that specifies the one or more second flags including the visual voicemail message waiting indication flag to request that the server system returns, for each mailbox in the list of mailboxes returned in response to the IMAP LIST request, the number of objects in the mailbox that are flagged with each of the one or more second flags.

20. The method of claim 16, wherein the IMAP LIST request uses a syntax that enables the IMAP LIST request to request the list of mailboxes, maintained by the server system for the user, that contain the objects flagged with any of the one or more flags specified in the single request.

21. The method of claim 16, wherein the IMAP LIST request further comprises a STATUS return option comprising a status item that specifies one or more second flags to request that the server system returns, for each mailbox in the list of mailboxes returned in response to the IMAP LIST request, a number of objects in a mailbox that are flagged with each of the one or more second flags.

22. The method of claim 16, wherein for each mailbox of the plurality of mailboxes of the user, a communication history comprised in a mailbox comprises at least two of a group consisting of: a call log between the user and a respective contact of the user, text message exchanges between the user and the respective contact of the user, and visual voicemail messages from the respective contact of the user to the user.

23. A server system, comprising:

a communication interface;

one or more processors; and memory storing instructions that are executable by the one or more processors whereby the server system is operable to:

receive, via the communication interface, a single request from a client device for a list of mailboxes, maintained by the server system for a user, that contain objects flagged with any of one or more flags specified in the single request, wherein the server system maintains a plurality of mailboxes for the user, wherein the one or more flags specified in the single request comprise a visual voicemail message waiting indication flag, and wherein to receive the single request, the server system is operable to receive an Internet Message Access Protocol (IMAP) LIST request comprising a selection option that specifies the one or more flags including the visual voicemail message waiting indication flag to restrict the list of mailboxes returned in response to the IMAP LIST request to the list of mailboxes, maintained by the server system for the user, that contain the objects flagged with any of the one or more flags;

process the single request to determine the list of mailboxes, maintained by the server system for the user, that contain the objects flagged with any of the one or more flags specified in the single request; and send, to the client device via the communication interface, the list of mailboxes, maintained by the server system for the user, that contain the objects flagged with any of the one or more flags specified in the single request.

24. A computer readable medium storing instructions executable by at least one processor of a server system to thereby instruct the server system to:

receive a single request from a client device for a list of mailboxes, maintained by the server system for a user, that contain objects flagged with any of one or more flags specified in the single request, wherein the server system maintains a plurality of mailboxes for the user, wherein the one or more flags specified in the single request comprise a visual voicemail message waiting indication flag, and wherein to receive the single request, the at least one processor instructs the server system to receive an Internet Message Access Protocol (IMAP) LIST request comprising a selection option that specifies the one or more flags including the visual voicemail message waiting indication flag to restrict the list of mailboxes returned in response to the IMAP LIST request to the list of mailboxes, maintained by the server system for the user, that contain the objects flagged with any of the one or more flags;

process the single request to determine the list of mailboxes, maintained by the server system for the user, that contain the objects flagged with any of the one or more flags specified in the single request; and send, to the client device, the list of mailboxes maintained by the server system for the user, that contain the objects flagged with any of the one or more flags specified in the single request.

25. A method of operation of a client device, the method comprising:

sending a command to a server, the command comprising a status item that specifies one or more flags for the command, wherein sending the command comprises sending an Internet Message Access Protocol (IMAP) LIST request comprising a selection option that specifies the one or more flags including a visual voicemail message waiting indication flag to restrict a list of mailboxes returned in response to the IMAP LIST request to mailboxes maintained by the server for a user that contain objects flagged with any of the one or more flags; and in response to the command, receiving, from the server, a response comprising, for each of one or more mailboxes, a number of objects in a mailbox that are flagged with each of the one or more flags specified by the status item.

* * * * *